US011388646B2

(12) United States Patent
Fujishiro et al.

(10) Patent No.: US 11,388,646 B2
(45) Date of Patent: Jul. 12, 2022

(54) CELL RESELECTION CONTROL METHOD, BASE STATION, AND RADIO TERMINAL

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 79 days.

(21) Appl. No.: 16/786,778

(22) Filed: Feb. 10, 2020

(65) Prior Publication Data

US 2020/0187084 A1  Jun. 11, 2020

Related U.S. Application Data

(63) Continuation of application No. PCT/JP2018/030069, filed on Aug. 10, 2018.
(Continued)

(51) Int. Cl.
*H04W 4/00* (2018.01)
*H04W 36/38* (2009.01)
(Continued)

(52) U.S. Cl.
CPC ..... *H04W 36/385* (2013.01); *H04W 36/0007* (2018.08); *H04W 36/08* (2013.01); *H04W 36/22* (2013.01); *H04W 76/11* (2018.02)

(58) Field of Classification Search
USPC ......... 455/436; 370/332, 331, 328, 329, 330
See application file for complete search history.

(56) References Cited

U.S. PATENT DOCUMENTS 9,883,428 B2 *  1/2018  Uemura ............ H04W 36/0083
10,728,811 B2 *  7/2020  Kim ...................... H04W 68/02
(Continued)

FOREIGN PATENT DOCUMENTS

CN  107889112 A  *  4/2018  ............ H04W 12/12
EP  3 267 732 A1  1/2018
(Continued)

OTHER PUBLICATIONS

VIA Telecom; Access Procedure Enhancements for MTC Applications; 3GPP TSG-RAN WG2 Meeting #70bis R2-103968; Jun. 28-Jul. 2, 2010; total 4 pages; Stockholm, Sweden.
(Continued)

*Primary Examiner* — David Q Nguyen
(74) *Attorney, Agent, or Firm* — Studebaker & Brackett PC

(57) ABSTRACT

A cell reselection control method according to one embodiment is a method in a mobile communication system. The cell reselection control method a step A of transmitting through a use of broadcast signaling, by a base station, as a redistribution parameter used for a redistribution function, a first redistribution parameter applied to a radio terminal in a first coverage and a second redistribution parameter applied to a radio terminal in a second coverage outside the first coverage, a step B of acquiring, by a radio terminal in an idle mode in the second coverage, the second redistribution parameter transmitted in the step A, and a step C of performing, by the radio terminal, cell reselection using the second redistribution parameter acquired in the step B. The redistribution function is a function of distributing cells and/or frequencies which a plurality of radio terminals in an idle mode reselects by cell reselection. The second coverage is a coverage extended by an enhanced coverage function including repetitive transmissions.

8 Claims, 12 Drawing Sheets

Related U.S. Application Data

(60) Provisional application No. 62/668,889, filed on May 9, 2018, provisional application No. 62/564,430, filed on Sep. 28, 2017, provisional application No. 62/543,474, filed on Aug. 10, 2017.

(51) Int. Cl.
*H04W 76/11* (2018.01)
*H04W 36/00* (2009.01)
*H04W 36/08* (2009.01)
*H04W 36/22* (2009.01)

(56) References Cited

U.S. PATENT DOCUMENTS

| | | | |
|---|---|---|---|
| 2012/0294146 A1 | 11/2012 | Wu | |
| 2014/0128029 A1 | 5/2014 | Fong et al. | |
| 2016/0014815 A1 | 1/2016 | Vajapeyam et al. | |
| 2016/0374048 A1 | 12/2016 | Griot et al. | |
| 2017/0099660 A1 | 4/2017 | Oh | |
| 2017/0164250 A1* | 6/2017 | Kim | H04W 88/02 |
| 2017/0230883 A1 | 8/2017 | Dang | |
| 2018/0035342 A1 | 2/2018 | Fujishiro et al. | |
| 2018/0324854 A1 | 11/2018 | Phuyal et al. | |
| 2020/0314713 A1* | 10/2020 | Jung | H04W 48/20 |

FOREIGN PATENT DOCUMENTS

| | | | |
|---|---|---|---|
| JP | 2010-232811 A | 10/2010 | |
| JP | 2013-528985 A | 7/2013 | |
| JP | 2014-522199 A | 8/2014 | |
| JP | 2016-537938 A | 12/2016 | |
| WO | 2016/163545 A1 | 10/2016 | |
| WO | 2016/204985 A1 | 12/2016 | |

OTHER PUBLICATIONS

Qualcomm Incorporated, "Early data transmission", 3GPP TSG-RAN WG1 Meeting #89, R1-1708800, May 15-19, 2017, total 10 pages, Hangzhou, China.
Ericsson; "Early Data Transmission for LTE-MTC"; 3GPP TSG-RAN WG1 #89s; R1-1706886; May 15-19, 2017; pp. 1-9; Hangzhou, China.
LG Electronics; "Data Transmission During Random Access Procedure in MTC"; 3GPP TSG RAN WG1 Meeting #89; R1-1707570; May 15-19, 2017; pp. 1-5; Hangzhou, P.R. China.
LG Electronics; "Data Transmission During Random Access Procedure in NB-IoT"; 3GPP TSG RAN WG1 Meeting #92bis; R1-1804522; Apr. 16-20, 2018; pp. 1-9; Sanya, China.
Interdigital Inc.; "RACH Configuration for NR"; 3GPP TSG-RAN WG2#NR AdHoc#2; R2-1706685; Jun. 27-29, 2017; pp. 1-3; Qingdao, China.
Huawei et al.; "Early DL Data Transmission"; 3GPP TSG RAN WG2 Meeting #101; R2-1802222; Feb. 26-Mar. 2, 2018; pp. 1-6; Athens, Greece.
Ericsson; "Details on PRACH Partitioning for EDT"; 3GPP TSG RAN WG2 Meeting #101; R2-1803078; Feb. 26-Mar. 2, 2018; pp. 1-11; Athens, Greece.
Intel Corporation; "[101#58][NB-IoT/MTC R15] EDT Security Issues"; 3GPP TSG RAN WG2 Meeting #101bis; R2-1804899; Apr. 16-20, 2018; pp. 1-34; Sanya, China.
Huawei; "Report of the Email Discussion [101#57][NB-IoT/MTC R15] EDT Remaining Issues"; 3GPP TSG-RAN WG2 Meeting #101 bis; R2-1805078; Apr. 16-20, 2018; pp. 1-25; Sanya, China.

* cited by examiner

| ENHANCED COVERAGE LEVEL #0 | SECOND REDISTRIBUTION PARAMETER #0 |
| ENHANCED COVERAGE LEVEL #1 | SECOND REDISTRIBUTION PARAMETER #1 |
| ENHANCED COVERAGE LEVEL #2 | SECOND REDISTRIBUTION PARAMETER #2 |
| ENHANCED COVERAGE LEVEL #3 | SECOND REDISTRIBUTION PARAMETER #3 |

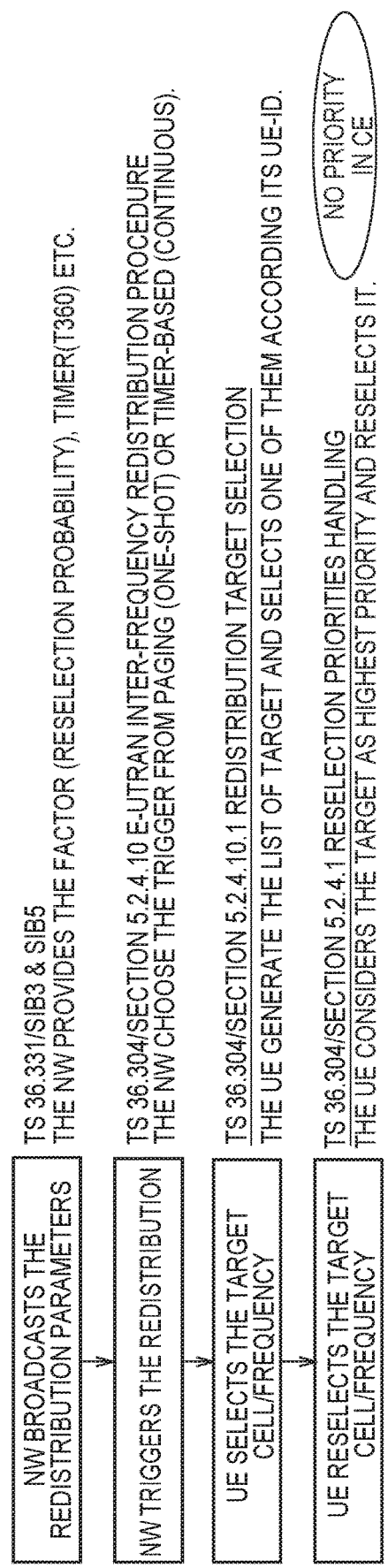

CELL RESELECTION CONTROL METHOD, BASE STATION, AND RADIO TERMINAL

RELATED APPLICATIONS

Cross-Reference

The present application claims the benefit of U.S. Provisional Application No. 62/543,474 (filed on Aug. 10, 2017), U.S. Provisional Application No. 62/564,430 (filed on Sep. 28, 2017), and U.S. Provisional Application No. 62/668,889 (filed on May 9, 2018). The content of which is incorporated by reference herein in their entirety.

TECHNICAL FIELD

The present disclosure relates to a cell reselection control method, a base station, and a radio terminal in a mobile communication system.

BACKGROUND ART

In recent years, radio terminals for machine type communication (MTC) and Internet of Things (IoT) services that perform communication without human intervention have attracted attention. Such a radio terminal is required to realize cost reduction, coverage extension, and low power consumption. For this reason, in the 3rd Generation Partnership Project (3GPP), a new category of radio terminals has been specified in which the transmission/reception bandwidth is limited to only part of the system transmission/reception band. An enhanced coverage function including repetitive transmissions (repetition) and the like is applied to the new category of radio terminals includes.

SUMMARY

A cell reselection control method according to one embodiment is a method in a mobile communication system. The cell reselection control method a step A of transmitting through a use of broadcast signaling, by a base station, as a redistribution parameter used for a redistribution function, a first redistribution parameter applied to a radio terminal in a first coverage and a second redistribution parameter applied to a radio terminal in a second coverage outside the first coverage, a step B of acquiring, by a radio terminal in an idle mode in the second coverage, the second redistribution parameter transmitted in the step A, and a step C of performing, by the radio terminal, cell reselection using the second redistribution parameter acquired in the step B. The redistribution function is a function of distributing cells and/or frequencies which a plurality of radio terminals in an idle mode reselects by cell reselection. The second coverage is a coverage extended by an enhanced coverage function including repetitive transmissions.

BRIEF DESCRIPTION OF DRAWINGS

FIG. 15 is a diagram related to the appendix.

DESCRIPTION OF EMBODIMENTS

First Embodiment

Outline of First Embodiment

A redistribution function for distributing cells and/or frequencies that are reselected by a plurality of radio terminals in an idle mode by cell reselection is known. Specifically, the base station transmits a redistribution parameter used for the redistribution function through the use of broadcast signaling. The radio terminal in the idle mode acquires the redistribution parameter, and performs cell reselection based on the acquired redistribution parameter.

Such a redistribution function is assumed to be applied to a radio terminal in a coverage (first coverage) that is not extended by the enhanced coverage function. However, the enhanced coverage function increases the cell load due to repetitive transmissions, etc., so that it is desired that the redistribution function can be applied to a radio terminal in a coverage (second coverage) extended by the enhanced coverage function.

Therefore, the first embodiment provides cell reselection control that enables the radio terminals in the idle mode in the coverage extended by the enhanced coverage function to be appropriately distributed to a plurality of cells and/or frequencies by the cell reselection.

A method of controlling a cell reselection according to the first embodiment is a method in a mobile communication system. The method of controlling the cell reselection includes a step A in which a base station transmits, as a redistribution parameter used for a redistribution function, a first redistribution parameter applied to a radio terminal in a first coverage and a second redistribution parameter applied to a radio terminal in a second coverage outside the first coverage through a use of broadcast signaling, a step B in which a radio terminal in an idle mode in the second coverage acquires the second redistribution parameter transmitted in the step A, and a step C in which the radio terminal performs cell reselection using the second redistribution parameter acquired in the step B. The redistribution function is a function of distributing cells and/or frequencies that a plurality of radio terminals in an idle mode reselects by cell reselection. The second coverage is a coverage extended by an enhanced coverage function including repetitive transmissions.

According to such a method of controlling the cell reselection, the redistribution function can also be applied to a radio terminal in the coverage (second coverage) extended by the enhanced coverage function. In addition, since it is possible to apply individual redistribution parameters to the radio terminal in the first coverage and the radio terminal in the second coverage, the cells and/or frequencies to be reselected by the radio terminal in the second coverage by cell reselection can be appropriately distributed.

(Mobile Communication System)

Figure 1:
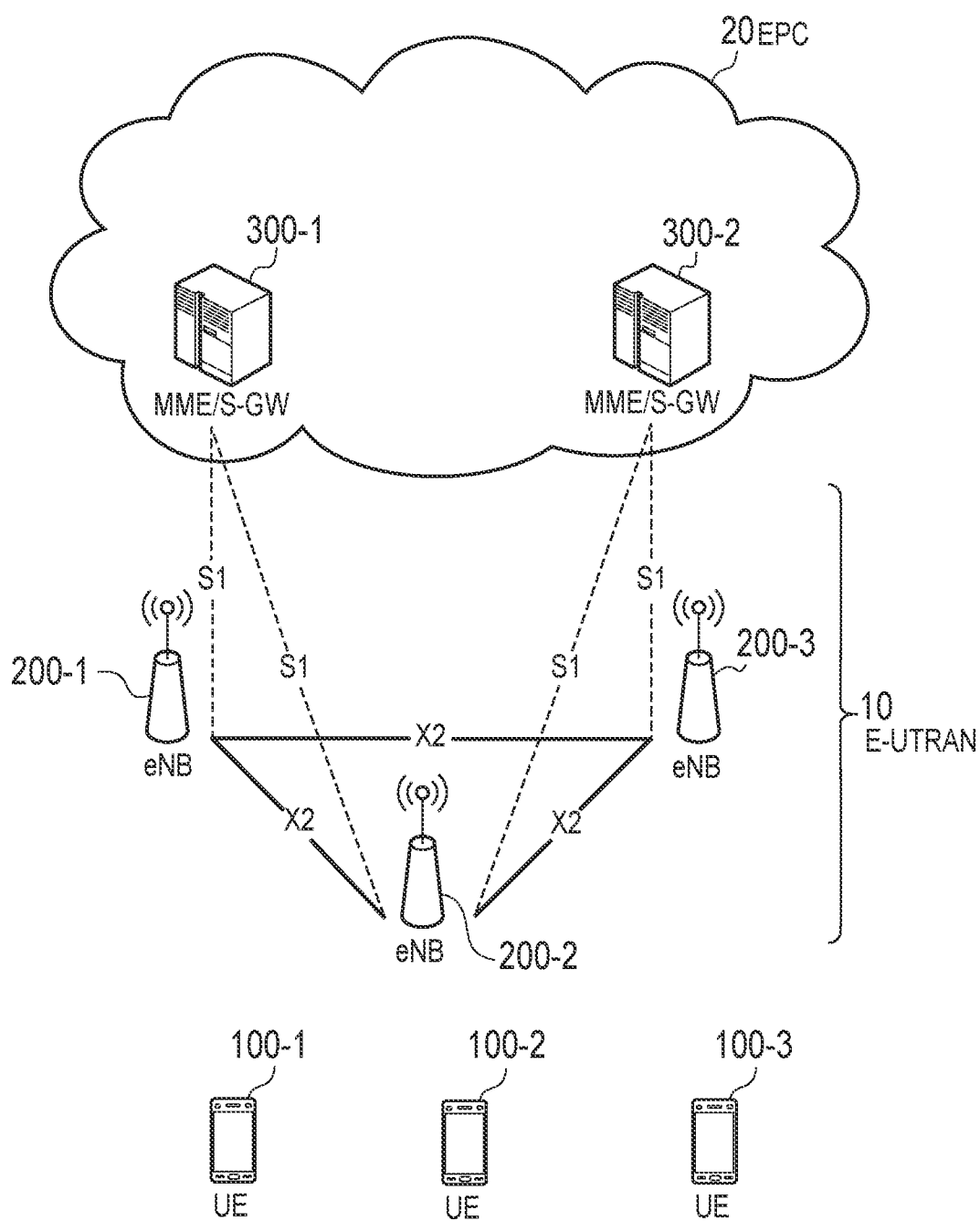
FIG. 1 is a diagram illustrating a configuration of an LTE system (mobile communication system) according to an embodiment.

A configuration of the mobile communication system according to the first embodiment will be described. FIG. 1 is a diagram illustrating a configuration of a long-term evolution (LTE) system that is a mobile communication system according to the first embodiment. The LTE system is a mobile communication system based on the 3GPP standard.

The LTE system includes a radio terminal (UE: User Equipment) 100, a radio access network (E-UTRAN: Evolved-UMTS Terrestrial Radio Access Network) 10, and a core network (EPC: Evolved Packet Core) 20.

The UE 100 is a mobile communication apparatus. The UE 100 performs radio communication with an eNB 200 that manages a cell (serving cell) in which the UE 100 exists.

The E-UTRAN 10 includes the base station (eNB: evolved Node-B) 200. The eNB 200 is connected to each other via an X2 interface. The eNB 200 manages one or a plurality of cells. The eNB 200 performs radio communication with UE 100 which establishes the connection with the own cell. The eNB 200 has a radio resource management (RRM) function, a routing function of user data (hereinafter simply referred to as "data"), a measurement control function for mobility control/scheduling, and the like. "Cell" is used as a term indicating a minimum unit of a radio communication area. "Cell" is also used as a term indicating a function or resource for performing radio communication with UE 100. One cell belongs to one carrier frequency.

The EPC 20 includes a mobility management entity (MME) and a serving gateway (S-GW) 300. The MME performs various types of mobility control etc. with respect to the UE 100. The MME manages tracking area (TA) information in which UE 100 exists by communicating with UE 100 using a non-access stratum (NAS) signaling. The tracking area is an area composed of a plurality of cells. The S-GW performs data transfer control. The MME and the S-GW are connected to the eNB 200 via an S1 interface.

Figure 2:
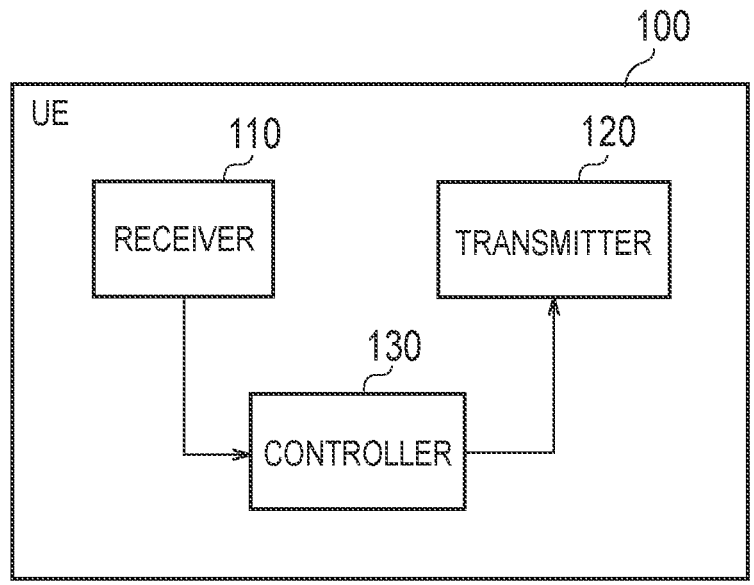
FIG. 2 is a diagram illustrating a configuration of a UE (radio terminal) according to the embodiment.

FIG. 2 is a diagram illustrating a configuration of the UE 100 (radio terminal). The UE 100 includes a receiver 110, a transmitter 120, and a controller 130.

The receiver 110 performs various types of reception under the control of the controller 130. The receiver 110 includes an antenna and a receiving device. The receiving device converts a radio signal received by the antenna into a baseband signal (reception signal) and outputs it to the controller 130.

The transmitter 120 performs various types of transmission under the control of the controller 130. The transmitter 120 includes an antenna and a transmission device. The transmission device converts a baseband signal (transmission signal) output by the controller 130 into a radio signal and transmits it from the antenna.

The controller 130 performs various types of control in the UE 100. The controller 130 includes at least one processor and at least one memory. The memory stores a program executed by the processor and information used for processing by the processor. The processor may include a baseband processor and a central processing unit (CPU). The baseband processor performs modulation/demodulation and encoding/decoding of the baseband signal. The CPU executes programs stored in the memory to perform various processes. The processor executes processing to be described later.

Figure 3:
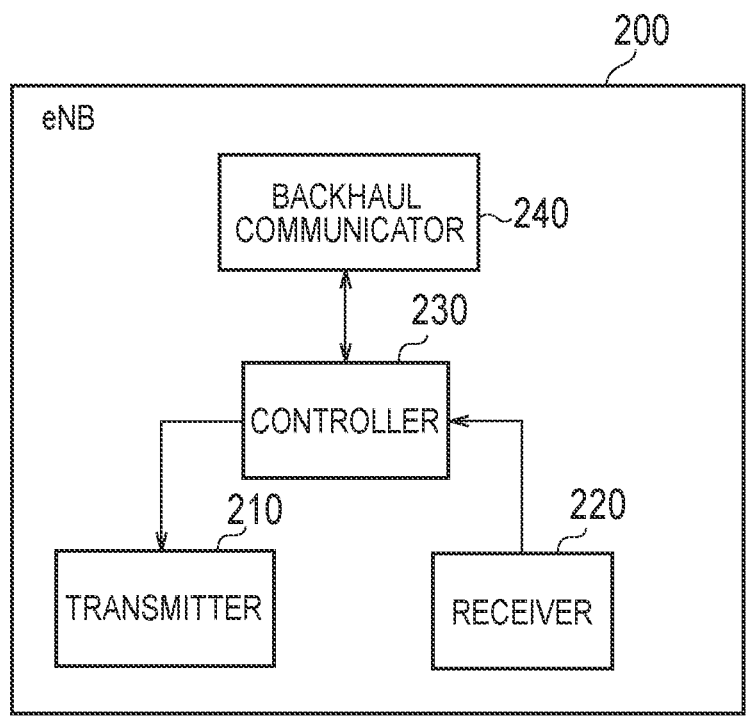
FIG. 3 is a diagram illustrating a configuration of an eNB (base station) according to the embodiment.

FIG. 3 is a diagram illustrating a configuration of the eNB 200 (base station). The eNB 200 includes a transmitter 210, a receiver 220, a controller 230, and a backhaul communication unit 240.

The transmitter 210 performs various types of transmissions under the control of the controller 230. The transmitter 210 includes an antenna and a transmission device. The transmission device converts the baseband signal (transmission signal) output by the controller 230 into a radio signal and transmits it from the antenna.

The receiver 220 performs various types of reception under the control of the controller 230. The receiver 220 includes an antenna and a receiving device. The receiving device converts a radio signal received by the antenna into a baseband signal (reception signal) and outputs it to the controller 230.

The controller 230 performs various types of controls in the eNB 200. The controller 230 includes at least one processor and at least one memory. The memory stores a program executed by the processor and information used for processing by the processor. The processor may include a baseband processor and a CPU. The baseband processor performs modulation/demodulation and encoding/decoding of the baseband signal. The CPU executes programs stored in the memory to perform various processes. The processor executes processing to be described later.

The backhaul communication unit 240 is connected to the adjacent eNB via the X2 interface. The backhaul communication unit 240 is connected to the MME/S-GW 300 via the S1 interface. The backhaul communication unit 240 is used for communication performed on the X2 interface, communication performed on the S1 interface, and the like.

Figure 4:
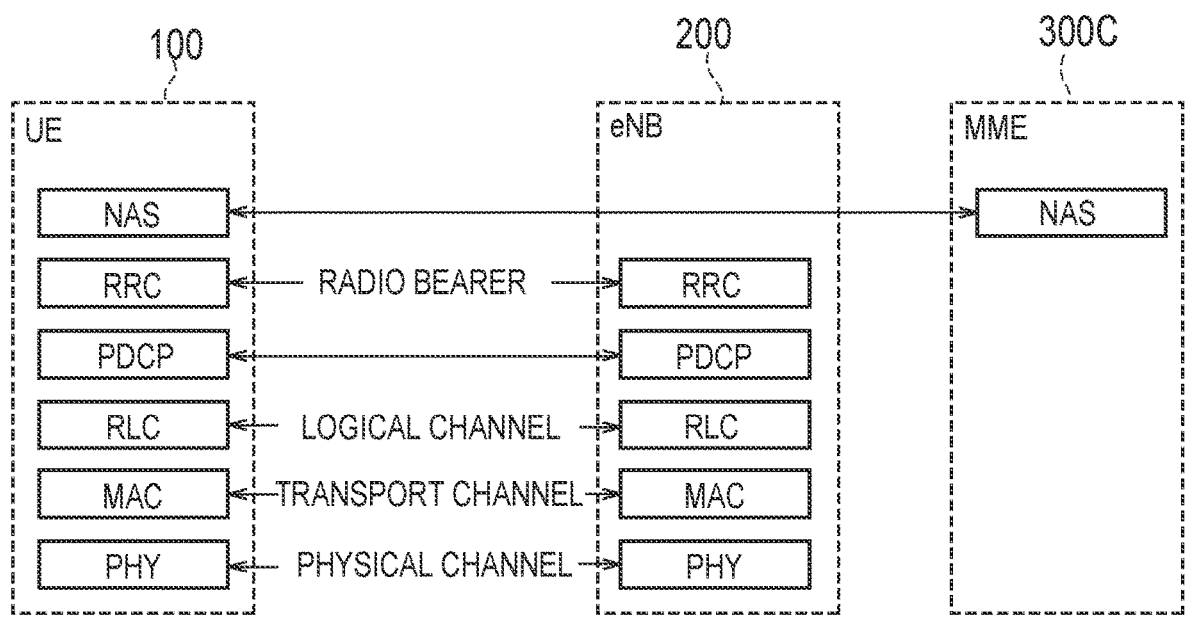
FIG. 4 is a diagram illustrating a protocol stack of a radio interface in the LTE system according to the embodiment.

FIG. 4 is a diagram illustrating a configuration of a protocol stack of a radio interface in the LTE system. As illustrated in FIG. 4, the radio interface protocol is divided into a first layer to a third layer of an OSI reference model. The first layer is a physical (PHY) layer. The second layer includes a medium access regulation (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute an access stratum (AS) layer.

The PHY layer performs encoding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs data priority control, retransmission processing by hybrid ARQ (HARQ), random access procedure, and the like. Data and control information are transmitted between the MAC layer of the UE 100 and the MAC layer of the eNB 200 via a transport channel. The MAC layer of eNB 200 includes a scheduler. The scheduler determines an uplink/downlink transport format (transport block size, modulation/coding scheme (MCS)) and a resource block allocated to the UE 100.

The RLC layer transmits data to the RLC layer on the receiving side using the functions of the MAC layer and the PHY layer. Between the RLC layer of UE 100 and the RLC layer of eNB 200, data and control information are transmitted via a logical channel.

The PDCP layer performs header compression/decompression and encryption/decryption.

The RRC layer is defined only in the control plane that handles control information. The RRC signaling for various settings is transmitted between the RRC layer of the UE 100 and the RRC layer of the eNB 200. The RRC layer controls a logical channel, a transport channel, and a physical channel according to establishment, re-establishment, and release of a radio bearer. When there is a connection (RRC connection) between the RRC of the UE 100 and the RRC of the eNB 200, the UE 100 is in the RRC connected mode. When there is no connection (RRC connection) between the RRC of the UE 100 and the RRC of the eNB 200, the UE 100 is in the RRC idle mode.

An NAS layer located above the RRC layer performs session management, mobility management and the like. NAS signaling is transmitted between the NAS layer of UE 100 and the NAS layer of an MME 300C. The UE 100 has functions such as an application layer in addition to the radio interface protocol.

Figure 5:
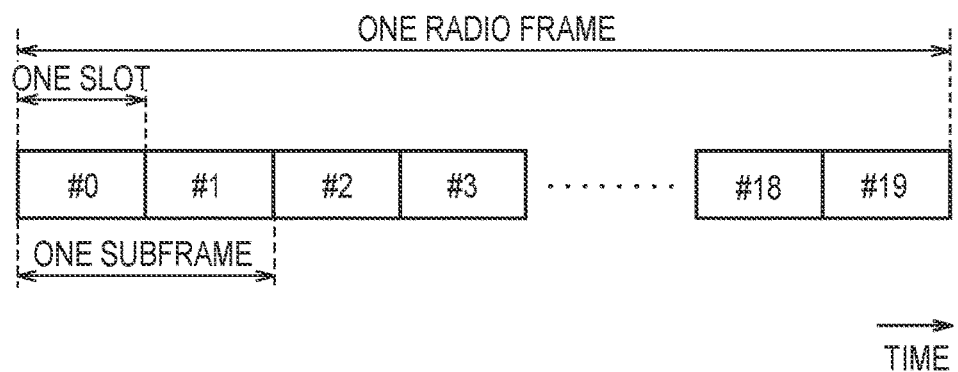
FIG. 5 is a diagram illustrating a configuration of a radio frame of the LTE system according to the embodiment.

FIG. 5 is a diagram illustrating a configuration of a radio frame used in the LTE system. The radio frame is composed of 10 subframes on the time axis. Each subframe is composed of two slots on the time axis. The length of each subframe is 1 ms. The length of each slot is 0.5 ms. Each subframe includes a plurality of resource blocks (RB) on the frequency axis. Each subframe includes a plurality of symbols on the time axis. Each resource block includes a plurality of subcarriers on the frequency axis. Specifically, one RB is configured by 12 subcarriers and one slot. One resource element (RE) is configured by one symbol and one subcarrier. Of the radio resources (time/frequency resources) allocated to UE 100, the frequency resource can be specified by the resource block, and the time resource can be specified by the subframe (or slot).

In the downlink, the section of the first few symbols of each subframe is an area used as a physical downlink control channel (PDCCH) for mainly transmitting downlink control information. The remaining part of each subframe is an area that can be used as a physical downlink shared channel (PDSCH) for mainly transmitting downlink data.

In the uplink, both ends of each subframe in the frequency direction are areas used as a physical uplink control channel (PUCCH) for mainly transmitting uplink control information. The remaining part of each subframe is an area that can be used as a physical uplink shared channel (PUSCH) for mainly transmitting uplink data.

(Outline of Cell Reselection)

The outline of the cell reselection operation will be described. When the start condition is satisfied the UE 100 in the idle mode (RRC idle mode) measures the quality of the adjacent cell adjacent to the current serving cell, and selects a cell to be used as a serving cell from cells satisfying the selection condition.

First, the start conditions are as indicated below.

(A1) A frequency having a priority higher than the priority of the frequency of the current serving cell:

The UE 100 always measures the quality of a frequency having a high priority.

(A2) A frequency having a priority equal to or lower than the priority of the frequency of the current serving cell:

The UE 100 measures the quality of frequencies having an equal or a lower priority when the quality of the current serving cell falls below a predetermined threshold value.

Secondly, the selection conditions are indicated as follows.

(B1) The priority of the adjacent cell frequency is higher than the priority of the current serving cell:

The UE 100 selects a cell that satisfies the relationship of Squal>ThreshX,HighQ over a predetermined period (TreselectionRAT) or a cell that satisfies the relationship of Srxlev>ThreshX,HighP over a predetermined period (TreselectionRAT). In such a case, the criterion that the adjacent cell should satisfy may be referred to as an "S-criteria".

Squal represents the cell selection quality level. The Squal is calculated by Squal=Qqualmeas−(Qqualmin+Qqualminoffset)−Qoffsettemp. Qqualmeas is the quality level (RSRQ) of the adjacent cell. Qqualmin is the minimum required quality level. Qqualminoffset is a predetermined offset that is constantly applied to the adjacent cell. Qoffsettemp is an offset temporarily applied to the adjacent cell. ThreshX,HighQ is predetermined threshold value.

Srxlev represents cell selection reception power. Srxlev is calculated by Srxlev=Qrxlevmeas−(Qrxlevmin+Qrxlevminoffset)−Pcompensation−Qoffsettemp. Qrxlevmeas is the reception power (RSRP) of the adjacent cell. Qrxlevmin is the minimum required reception power. Qrxlevminoffset is a predetermined offset that is constantly applied to the adjacent cell. Pcompensation is a parameter related to uplink capability. Qoffsettemp is an offset temporarily applied to the adjacent cell. ThreshX,HighP is a predetermined threshold value.

(B2) The frequency priority of the adjacent cell is the same as the priority of the current serving cell:

The UE 100 calculates the ranking Rs of the current serving cell and the ranking Rn of the adjacent cell. The UE 100 selects, as a target cell, a cell having the ranking Rn higher than the Rs over a predetermined period (TreselectionRAT). In such a case, the criterion to be satisfied by the adjacent cell may be referred to as an "R-criteria".

The Rs is calculated by Rs=Qmeas,s+QHyst−Qoffsettemp. Rn is calculated by Rn=Qmeas,n−Qoffset−Qoffsettemp. Qmeas,s is the reception power (RSRP) of the current serving cell. Qmeas,n is the reception power (RSRP) of the adjacent cell. QHyst is a hysteresis value for facilitating reselection of the current serving cell as the target cell. Qoffsettemp is an offset that is temporarily applied to the current serving cell and the adjacent cell.

(B3) The priority of the frequency of the adjacent cell is lower than the priority of the current serving cell:

Under the premise that Squal<ThreshServing,LowQ is satisfied over the predetermined period (TreselectionRAT), or Srxlev<ThreshServing,LowP is satisfied over the predetermined period (TreselectionRAT), the UE 100 selects a target cell from adjacent cells by the same method as in (B1) described above.

However, ThreshServing,LowQ, and ThreshServing,LowP are predetermined threshold values, as in ThreshX,HighQ, and ThreshX,HighP.

Various parameters used in selecting the target cell are included in information (SIB: System Information Block) broadcast from the eNB 200. The various parameters include the frequency priority (cellReselectionPriority), the predetermined period (TreselectionRAT), the various offsets (Qqualminoffset, Qrxlevminoffset, Qoffsettemp, QHyst, and Qoffset), and the various threshold values (ThreshX,HighQ, ThreshX,HighP, ThreshServing,LowQ, and ThreshServing,LowP).

Rs may be calculated by Rs=Qmeas,s+QHyst−Qoffsettemp+QoffsetSCPTM+QoffsetRedistrCE instead of the above equation. Rn may be calculated by Rn=Qmeas,n−

Qoffset=Qoffsettemp+QoffsetSCPTM+QoffsetRedistrCE instead of the above equation. Qmeas,s, Qmeas,n, QHyst, and Qoffsettemp may be the same as above. QoffsetSCPTM is temporarily applied to the frequency of the SC-PTM, and is applied to all cells on the frequency of the SC-PTM. When QoffsetSCPTM is enabled, Qoffset for a cell of the different frequency is not used. QoffsetRedistrCE is an offset applied to the UE 100 that is in the coverage extended by the enhanced coverage function or the UE 100 of NB-IoT. This offset may be applied the target frequency or cell for redistribution while the timer (T360) is operating and/or until the redistribution procedure triggered by the fact that the timer (T360) has expired or suspended is completed.

Further, QoffsetSCPTM and QoffsetRedistrCE are also included in the information broadcast from the eNB 200, as in the above various parameters.

(Outline of Redistribution Function)

The LTE system according to the first embodiment has a redistribution function. The redistribution function is a function of distributing cells and/or frequencies reselected by a plurality of UEs in an idle mode through cell reselection. In particular, in the redistribution function, the UE 100 selects a redistribution target (frequency or cell) based on redistribution parameters transmitted from eNB 200 through the use of broadcast signaling (e.g. SIB). For example, the UE 100 performs cell reselection of another frequency (inter-frequency) for the redistribution target.

The UE 100 is redistributed to the redistribution target (frequency or cell), and is regarded to have the highest priority (that is, higher than the priority of any network configuration) in the redistributed redistribution target for a certain period (that is, validity timer). The network configuration priority is, for example, a frequency priority (cellReselectionPriority) included in the SIB. Such redistribution can be triggered by paging. A certain period (validity timer) is referred to as T360. When redistribution is not triggered by paging, the UE 100 performs a redistribution operation periodically (that is, every time T360 expires).

According to the redistribution function in a situation where a plurality of UEs 100 in the idle mode is concentrated on a specific cell or a specific frequency, the plurality of UEs 100 can be redistributed to another cell (of another frequency). Therefore, it is possible to avoid the concentration of the load on a specific cell or a specific frequency.

(Outline of eMTC and NB-IoT)

The outline of eMTC and NB-IoT will be described. In the first embodiment, a scenario is assumed in which there is a new category of the UE 100 for MTC and IoT services. The new category of the UE 100 is a UE 100 whose transmission/reception bandwidth is limited to only part of the system transmission/reception band (LTE transmission/reception bandwidth). The new UE category is referred to as, for example, a category M1 and a category NB (Narrow Band)-IoT. The category M1 is a category to which an enhanced machine type communications (eMTC) UE belongs. The category NB-IoT (category NB1) is a category to which the NB-IoT UE belongs. The category M1 restricts the transmission/reception bandwidth of the UE 100 (eMTC UE) to, for example, 1.08 MHz (that is, the bandwidth of 6 resource blocks). The category NB-IoT (category NB1) further restricts the transmission/reception bandwidth of UE 100 (NB-IoT UE) to 180 kHz (that is, the bandwidth of one resource block). By narrowing the bandwidth, it is possible to realize cost reduction and low power consumption required for the eMTC UE and the NB-IoT UE.

Figure 6:
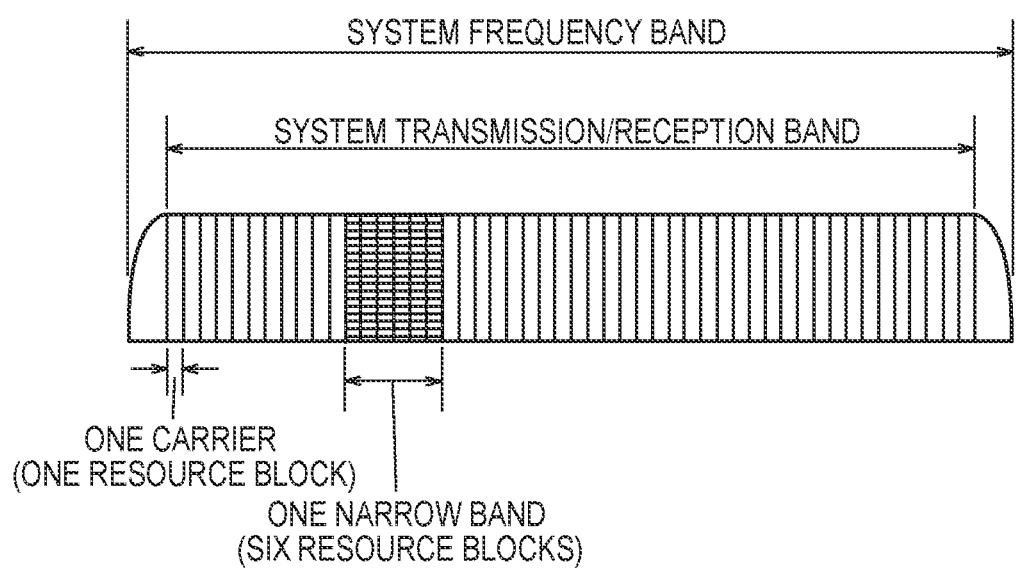
FIG. 6 is a diagram illustrating frequency channels handled by the eMTC UE and the NB-IoT UE.

FIG. 6 is a diagram illustrating frequency channels handled by the eMTC UE and the NB-IoT UE. As illustrated in FIG. 6, the frequency bandwidth of the system frequency band of the LTE system may be 10 MHz. The bandwidth of the system transmission/reception band is, for example, 50 resource blocks=9 MHz. The bandwidth of the frequency channel that can be supported by the eMTC UE is within 6 resource blocks=1.08 MHz. A frequency channel within 6 resource blocks that can be supported by the eMTC UE is referred to as a "narrow band (NB)". The bandwidth of the frequency channel that can be supported by the NB-IoT UE is 1 resource block=180 kHz. A frequency channel of one resource block that can be supported by the NB-IoT UE is referred to as a "carrier".

The eMTC UE is operated within the LTE transmission/reception bandwidth. The NB-IoT UE supports a form operated within the LTE transmission/reception bandwidth, a form operated with a guard band outside the LTE transmission/reception bandwidth, and a form operated within the frequency band dedicated to the NB-IoT. The eMTC UE and the NB-IoT UE support the enhanced coverage (EC) function using repetitive transmissions and the like to realize the coverage extension. The enhanced coverage function may include repetitive transmissions (repetition) in which the same signal using a plurality of subframes is repeatedly transmitted. The coverage can be extended as the number of the repetitive transmissions increases. The enhanced coverage function may include power boosting that increases the power density of the transmission signal. As an example, the power density is increased by narrow band transmission for narrowing the frequency bandwidth of the transmission signal. The coverage can be extended as the power density of the transmission signal is increased. The enhanced coverage function may include lower MCS (lower MCS) transmission for lowering the MCS used for the transmission signal. The coverage can be extended by performing transmission using the MCS with a low data rate and high error tolerance.

The eMTC UE and the NB-IoT UE in the RRC idle mode may determine that they are in the enhanced coverage when the first cell selection criterion (the 1S-criteria) for the normal coverage is not satisfied, and the second cell selection criterion (the 2S-criteria) for the enhanced coverage is satisfied. "The UE in enhanced coverage" may mean a UE that is required to use the enhanced coverage function (enhanced coverage mode) to access the cell.

The enhanced coverage function may have a plurality of enhanced coverage levels with different degrees of extending coverage. The eMTC UE and the NB-IoT UE measure reference signal received power (RSRP), and determine their own enhanced coverage level by comparing the measured RSRP with the RSRP threshold value for each enhanced coverage level. The enhanced coverage level is related to at least the number of transmissions (that is, the number of repetitions) in repetitive transmissions.

The UE in enhanced coverage performs cell reselection by ranking based on reception power (RSRP) regardless of the frequency priority in the cell reselection described above. For example, the UE calculates the ranking Rs of the current serving cell and the ranking Rn of the adjacent cell, and selects the cell having the ranking Rn higher than the Rs over a predetermined period (TreselectionRAT) as a target cell (new serving cell).

(Cell Reselection Control Method)

A method of controlling the cell reselection according to the first embodiment will be described.

Figure 7:
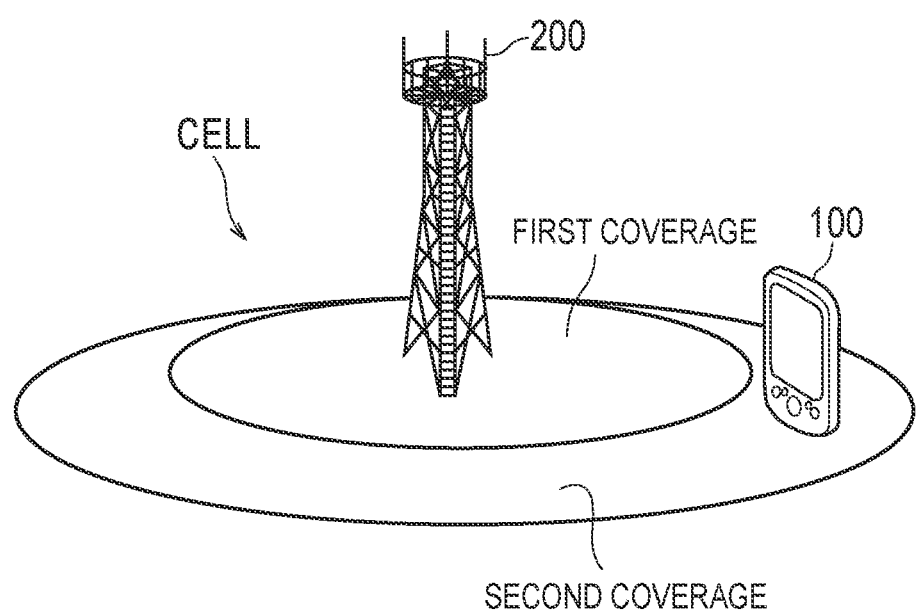
FIG. 7 is a diagram illustrating an application scene of the method of controlling the cell reselection according to the embodiment.

FIG. 7 is a diagram illustrating an application scene of the method of controlling the cell reselection according to the first embodiment.

As illustrated in FIG. 7, the cell managed by the eNB 200 includes a first coverage and a second coverage outside the first coverage. The first coverage is a coverage that is not extended by the enhanced coverage function (that is, normal coverage). The second coverage is a coverage extended by the enhanced coverage function (that is, enhanced coverage). In the first embodiment, an example in which the UE 100 in the second coverage is an eMTC UE will be described. However, the UE 100 in the second coverage may be an NB-IoT UE.

Figures 8, 9:
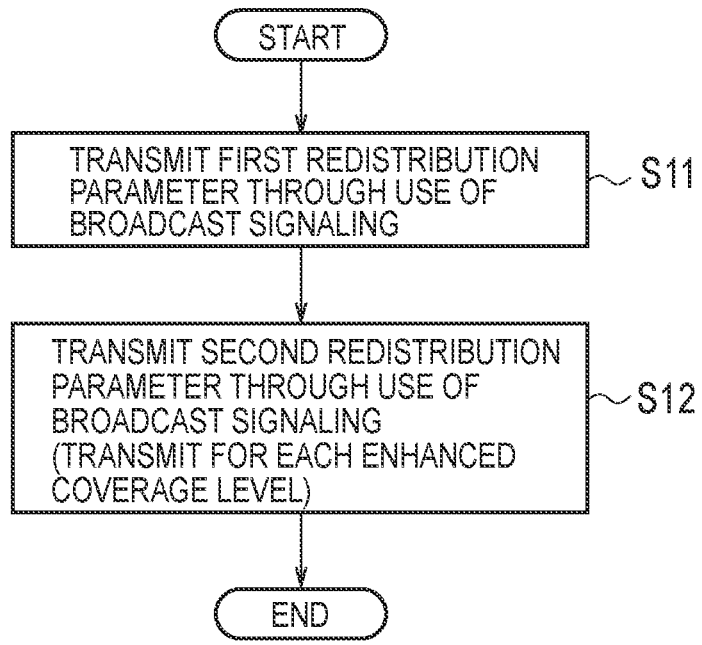
FIG. 8 is a diagram illustrating the operation of the eNB according to the embodiment.
FIG. 9 is a diagram illustrating a configuration example of a second redistribution parameter according to the embodiment.

FIG. 8 is a diagram illustrating an operation of the eNB 200 according to the first embodiment.

As illustrated in FIG. 8 in step S11 the eNB 200 transmits, as a redistribution parameter used for the redistribution function, the first redistribution parameter applied to the UE in the first coverage through the use of broadcast signaling (for example, SIB).

The first redistribution parameter includes, for example, a parameter indicating a probability for each cell (redistributionFactorCell) or a parameter indicating a probability for each frequency (redistributionFactorFreq). The UE in the first coverage acquires the first redistribution parameter and performs cell reselection using the first redistribution parameter. In particular, the UE in the first coverage selects a redistribution target (frequency or cell) based on its own UE identifier (IMSI: International Mobile Subscriber Identity) and a parameter indicating the probability for each cell or frequency. For more details on this operation, for example, refer to Chapters 5.2.4.10 and 5.2.4.10.1 of the 3GPP specification "TS 36.304 V13.3.0 (2016-09)". The eNB 200 transmits the first redistribution parameter using an SIB type 3 and an SIB type 5.

In step S12 the eNB 200 transmits, as a redistribution parameter used for the redistribution function, the second redistribution parameter applied to the UE in the second coverage through the use of broadcast signaling. Step S12 may be performed simultaneously with step S11.

The type of each parameter included in the second redistribution parameter may be the same as the type of each parameter included in the first redistribution parameter. The value of the parameter included in the second redistribution parameter can be configured to a value different from the value of the parameter included in the first redistribution parameter. The eNB 200 may transmit the second redistribution parameter using the SIB type 3 and the SIB type 5. As an example, the second redistribution parameter is provided as an information element (IE) different from that of the first redistribution parameter in the SIB type 3 and the SIB type 5. Alternatively, the second redistribution parameter may be provided in a SIB different from the SIB type 3 and the SIB type 5. The eNB 200 applies the enhanced coverage function including the repetitive transmissions to the transmission of the SIB including the second redistribution parameter.

The eNB 200 may individually transmit the second redistribution parameter for each enhanced coverage level. For example, as illustrated in FIG. 9, in the SIB including the second redistribution parameter, a list of second redistribution parameters for each enhanced coverage level may be provided. In the example illustrated in FIG. 9, second redistribution parameters #0 to #3 are associated with enhanced coverage levels #0 to #3, respectively. Note that the higher the enhanced coverage level, the greater the number of repetitive transmissions, and the greater the degree of coverage extension. Therefore, the higher the enhanced coverage level, the higher the load on the cell (eNB 200). Therefore, by defining individual second redistribution parameter for each enhanced coverage level, it is possible to finely distribute the load of the cell (eNB 200). In addition, in step S12, the eNB 200 may transmits, instead of transmitting the second redistribution parameter corresponding to the enhanced coverage level, the second redistribution parameter corresponding to the enhanced coverage mode (enhanced coverage function). For example, a list in which "enhanced coverage level #*" in the list illustrated in FIG. 9 is replaced with "enhanced coverage mode #*" may be included in the SIB. The enhanced coverage mode includes, for example, a plurality of modes (enhanced coverage modes A and B). In the enhanced coverage modes A and B, the maximum band (physical resource block) of PDSCH/PUSCH transmitted by the UE 100 is determined for each category of the UE 100 (category M1, M2, or 0 or more). In the enhanced coverage modes A and B, the maximum band of PDSCH/PUSCH for each category of the UE 100 may be different. Further, the enhanced coverage mode A may be a mode in which there is no repetitive transmissions (no repetition) or the number of repetitive transmissions is small, and the enhanced coverage mode B may be a mode in which the number of repetitive transmissions is larger than that in the enhanced coverage mode B.

Figure 10:
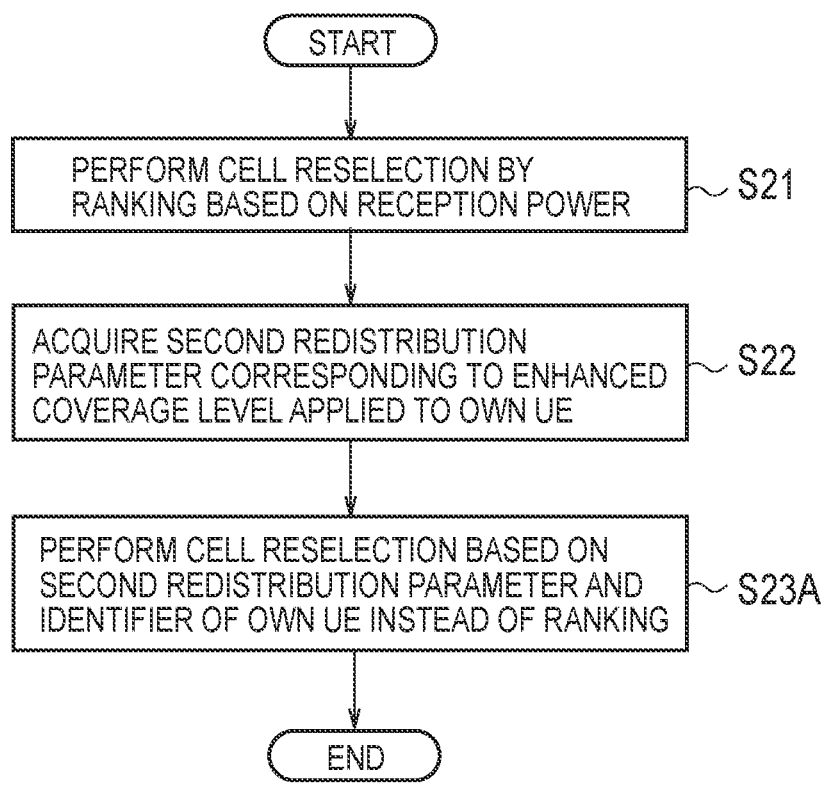
FIG. 10 is a diagram illustrating the operation of the UE in the second coverage according to the embodiment.

FIG. 10 is a diagram illustrating an operation of the UE 100 in the second coverage according to the first embodiment.

As illustrated in FIG. 10 in step S21 in a state where the UE 100 has not received the second redistribution parameter, the UE 100 performs, regardless of the priority specified by eNB 200, cell reselection by ranking based on reception power (RSRP). For example, the UE calculates the ranking Rs of the current serving cell and the ranking Rn of the adjacent cell, and selects the cell having the ranking Rn higher than the Rs over a predetermined period (TreselectionRAT) as a target cell (new serving cell).

In step S22, the UE 100 receives the SIB including the second redistribution parameter, and acquires the second redistribution parameter included in the SIB. When the second redistribution parameters are transmitted separately for each enhanced coverage level, the UE 100 may acquire the second redistribution parameter corresponding to the enhanced coverage level applied to the UE 100. For example, when the list illustrated in FIG. 9 is included in the SIB, it is assumed that the UE 100 is in the enhanced coverage (second coverage) of the enhanced coverage level #2. In this case, the UE 100 acquires the second redistribution parameter #2 corresponding to the enhanced coverage level #2 from the list illustrated in FIG. 9.

In step S23A, the UE 100 performs cell reselection based on the second redistribution parameter and the identifier of the UE 100 instead of ranking. Specifically, instead of the cell reselection based on the ranking in step S21, the cell reselection is performed by the same method as the UE in the first coverage. For example, the UE 100 selects a redistribution target (frequency or cell) based on its own UE identifier (IMSI) and a parameter indicating the probability for each cell or frequency. When the current serving cell (or current serving frequency) is selected as the redistribution target, the UE 100 may maintain the current serving cell (or current serving frequency). When a cell (or frequency) different from the current serving cell (or current serving frequency) is selected as the redistribution target, the UE 100 is redistributed to the redistribution target. When redistributed to the redistribution target, the UE 100 considers that the redistributed redistribution target has the highest priority (that is, higher than the priority of any network configuration) for a certain period (that is, validity timer).

Such redistribution can be triggered by paging. T360 corresponding to a certain period (validity timer) may be included in the second redistribution parameter. When redistribution is not triggered by paging, the UE 100 performs the redistribution operation periodically (every time T360 expires).

The UE 100 may determine that the second redistribution parameter is applied to cell reselection while the second redistribution parameter is broadcast. When redistribution is triggered by paging, after acquiring the second redistribution parameter, the UE 100 may apply the second redistribution parameter to cell reselection when redistribution is triggered by paging. When redistribution is not triggered by paging, the UE 100 may determine that the second redistribution parameter is applied to cell reselection while T360 corresponding to a certain period (validity timer) is operating. Note that information indicating whether redistribution is triggered by paging may be included in the second redistribution parameter.

In this way, according to the first embodiment, the redistribution function can be applied to the UE 100 that is in the coverage (second coverage) extended by the enhanced coverage function. In addition, since individual redistribution parameters can be applied to the UE in the first coverage and the UE 100 in the second coverage, the cell and/or frequency reselected by the UE 100 in the second coverage by cell reselection can be appropriately distributed.

In the first embodiment, the second redistribution parameter may be applied to cell reselection at least within the same frequency (intra-frequency). In the general redistribution function, it should be noted that the redistribution parameter is applied only to cell reselection between different frequencies (inter-frequency). The UE 100 in the coverage extended by the enhanced coverage function (second coverage) is assumed to be a UE that does not move, and it may be possible that it cannot detect the adjacent cell of different frequencies, and can detect only the adjacent cell of the same frequency. Thus, by applying the second redistribution parameter to cell reselection within the same frequency, cell reselection to the adjacent cell of the same frequency can be enabled using the second redistribution parameter. The second redistribution parameter may be transmitted/received separately from the redistribution parameter for between different frequencies as a redistribution parameter for within the same frequency. The second redistribution parameter may be transmitted/received as a parameter specific to a cell within the same frequency.

Modification

A modification of the first embodiment will be described. In the first embodiment described above, after acquiring the second redistribution parameter, the UE 100 in the second coverage performs cell reselection based on the second redistribution parameter and the identifier of the UE 100 instead of ranking. In contrast, in the modification of the first embodiment, the UE 100 in the second coverage performs cell reselection by applying a predetermined offset value to the ranking after acquiring the second redistribution parameter.

In the modification of the first embodiment, the eNB 200 may include an offset value applied to the ranking in the second redistribution parameter. The eNB 200 may individually transmit the second redistribution parameter including the offset value for each enhanced coverage level (see FIG. 9). The offset value may be a positive offset value that is adjusted to increase reception power (that is, ranking) corresponding to a specific cell or a specific frequency. The offset value may be a negative offset value that is adjusted to decrease the reception power (that is, ranking) corresponding to a specific cell or a specific frequency.

The offset value may be an infinite value. When the value is a positive infinite value, the specific cell or the specific frequency corresponding to the offset value is configured to the highest priority, and the specific cell or the specific frequency is necessarily selected as a redistribution target. Alternatively, the offset value may be a finite value (for example, 5 dB). When the value is a finite value, it may be a very large positive finite value. When the value is a positive finite value, the specific cell or the specific frequency corresponding to the offset value is not necessarily configured to the highest priority, and the specific cell or the specific frequency is likely to be configured to the highest priority.

The offset value may not be included in the second redistribution parameter. As the offset value, a value defined in the specification may be preconfigured in the UE 100. Hereinafter, an example in which the offset value is included in the second redistribution parameter will be described.

The UE 100 may apply an offset value (for example, an infinite or very large positive finite value) only to the target cell and/or frequency before cell reselection. In other words, the UE 100, before cell reselection, may use the offset value only to calculate the ranking Rn of the adjacent cell, and may not use the offset value to calculate the ranking Rs of the serving cell. The offset value here may be Qoffsettemp or QoffsetRedistrCE in the equation for obtaining Rs. In other words, the offset value here (an infinite or very large positive finite value) refers to Qoffsettemp or QoffsetRedistrCE, and the value may be used only for calculating Rn (the value of Qoffsettemp or QoffsetRedistrCE used for calculating Rs may be different from the value used for calculating Rn). After cell reselection, the UE 100, may apply the offset value only to the selected serving cell and/or frequency while the timer (T360) is operating (before the timer expires or stops). That is, after cell reselection, the UE 100 may use the offset value only for calculating the ranking Rs of the serving cell, and may not use it for calculating the ranking Rn of the adjacent cell.

In addition, when the redistribution procedure is triggered by expiration or stop of the timer (T360), the UE 100 may continue to apply the offset value (for example, an infinite or very large positive finite value) to the ranking until the redistribution procedure is completed.

Figure 11:
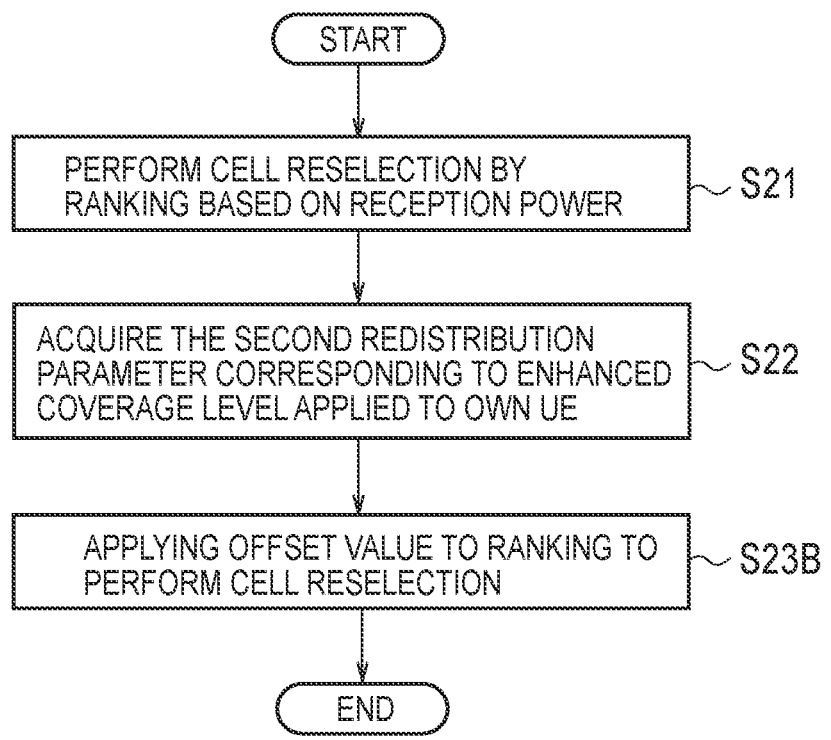
FIG. 11 is a diagram illustrating the operation of the UE in the second coverage according to the modification of the embodiment.

FIG. 11 is a diagram illustrating an operation of the UE 100 in the second coverage according to the modification of the first embodiment.

As illustrated in FIG. 11, step S21 is the same as in the first embodiment described above.

In step S22, the UE 100 receives the SIB including the second redistribution parameter, and acquires the second redistribution parameter included in the SIB. The second redistribution parameter may include an offset value for each cell or an offset value for each frequency. The second redistribution parameter may include a combination of an identifier and an offset value of a specific cell, or a combination of discernment and an offset value of a specific frequency. When the second redistribution parameters are transmitted separately for each enhanced coverage level, the UE 100 may acquire the second redistribution parameter corresponding to the enhanced coverage level applied to the UE 100.

In step S23B, the UE 100 performs cell reselection by applying a predetermined offset value to the ranking. For example, the UE calculates the ranking Rs of the current serving cell and the ranking Rn of the adjacent cell, applies an offset value to the ranking, and selects the cell having the highest ranking with the offset as the target cell (new serving cell) over the predetermined period (TreselectionRAT).

The UE 100 may determine that the second redistribution parameter is applied to cell reselection while the second redistribution parameter is broadcast. When redistribution is triggered by paging, after acquiring the second redistribution parameter, the UE 100 may apply the second redistribution parameter to cell reselection when redistribution is triggered by paging. Note that information indicating whether redistribution is triggered by paging may be included in the second redistribution parameter. When redistribution is not triggered by paging, the UE 100 may determine that the second redistribution parameter is applied to cell reselection while T360 corresponding to a certain period (validity timer) is operating.

Note that, in step S22, the eNB 200 the second redistribution parameter transmitted through the use of the SIB may correspond to the enhanced coverage mode (enhanced coverage function) instead of corresponding to the enhanced coverage level. Note that the second redistribution parameter may include an offset value applied to the ranking. The offset value may be an infinite or very large finite value. Note that the second redistribution parameter may correspond to the enhanced coverage level in addition to the enhanced coverage mode. The enhanced coverage mode includes, for example, a plurality of modes (enhanced coverage modes A and B). In the enhanced coverage modes A and B, the maximum band (physical resource block) of PDSCH/PUSCH transmitted by the UE 100 is determined for each category of the UE 100 (category M1, M2, or 0 or more). In the enhanced coverage modes A and B, the maximum band of PDSCH/PUSCH for each category of the UE 100 may be different. Further, the enhanced coverage mode A may be a mode in which there is no repetitive transmissions (no repetition) or the number of repetitive transmissions is small, and the enhanced coverage mode B may be a mode in which the number of repetitive transmissions is larger than that in the enhanced coverage mode B. In step S23B, the UE may apply the second redistribution parameter that corresponds to the enhanced coverage mode applied to the UE of the second redistribution parameters included in the received SIB, and may perform cell reselection using the second redistribution parameter.

Second Embodiment

The second embodiment will be described mainly with respect to differences from the first embodiment.

Outline of Second Embodiment

In the first embodiment described above, using the redistribution function, the operation of appropriately distributing the UEs 100 in an idle mode in the coverage extended by the enhanced coverage function to a plurality of cells and/or frequencies by cell reselection has been described.

The second embodiment is an embodiment that makes it possible to obtain the same effect as the first embodiment by improving the normal cell reselection procedure without using the redistribution function. The second embodiment is mainly directed to the UE 100 in an idle mode in the coverage extended by the enhanced coverage function. However, the second embodiment may be applied to the UE 100 in an idle mode in the normal coverage.

As mentioned above, the UE 100 in enhanced coverage performs cell reselection by the ranking based on reception power (RSRP) regardless of the priority of the frequency in cell reselection. For example, the UE calculates the ranking Rs of the current serving cell and the ranking Rn of the adjacent cell, and selects the cell having the ranking Rn higher than the Rs over a predetermined period (TreselectionRAT) as a target cell (new serving cell). For example, the Rs is calculated by Rs=Qmeas,s+QHyst−Qoffsettemp. Rn is calculated by Rn=Qmeas,n−Qoffset−Qoffsettemp. Here, various offset values (Qoffsettemp, QHyst, Qoffset) are part of cell reselection parameters included in the SIB broadcast from the eNB 200.

Under these assumptions, it is conceivable that by changing the cell reselection parameter in the first cell with high load (hereinafter referred to as a "first cell reselection parameter"), the UE 100 in the first cell is caused to perform cell reselection to the second cell (adjacent cell) to distribute the load of the first cell to the second cell. When the UE 100 performs cell reselection to the second cell, the UE 100 performs cell reselection using the SIB broadcast in the second cell. In particular, the UE 100 performs the above ranking operation using the cell reselection parameter acquired from the second cell (hereinafter referred to as a "second cell reselection parameter"), and determines whether to stay in the second cell or to perform cell reselection to the adjacent cell. Here, when the second cell reselection parameter is inappropriate, the UE 100 may perform cell reselection from the second cell to the first cell using the second cell reselection parameter immediately after performing cell reselection from the first cell to the second cell. When such a ping-pong phenomenon occurs, the load of the first cell cannot be distributed to the second cell.

It may be conceivable that when changing the first cell reselection parameter in the first cell with high load, the second cell also changes the second cell reselection parameter, so that the occurrence of the ping-pong phenomenon may be avoided. However, when the cell reselection parameter is changed for load distribution of the cell, it is necessary for the cell reselection parameter to be able to change frequently (dynamically). It is inefficient and not a desirable method that the second cell reselection parameter is changed in the second cell every time the first cell reselection parameter is changed in the first cell.

To solve such a problem, the method of controlling a cell reselection according to the second embodiment includes a step in which the UE 100 selecting a first cell as a serving cell receives a first cell reselection parameter broadcast from the first cell, a step in which the UE 100 reselects a second cell different from the first cell as the serving cell using the first cell reselection parameter, and a step in which the UE 100 defers a start of cell reselection using a second cell reselection parameter broadcast from the second cell until a predetermined period elapses after the second cell is reselected as the serving cell.

In this way, the UE 100 that has performed cell reselection from the first cell to the second cell using the first cell reselection parameter defers the start of cell reselection using the second cell reselection parameter broadcast from the second cell until the predetermined period has elapsed since reselecting the second cell. As a result, the operation in which the UE 100 performs cell reselection from the second cell to the first cell using the second cell reselection parameter immediately after performing cell reselection from the first cell to the second cell, that is, the ping-pong phenomenon, can be prevented.

The cell reselection includes comparing the first ranking determined according to the first reception power corresponding to the serving cell with the second ranking determined according to the second reception power corresponding to the adjacent cell. Each of the first cell reselection parameter and the second cell reselection parameter includes an offset value applied to the first reception power and/or an offset value applied to the second reception power.

In the method of controlling the cell reselection according to the second embodiment, the method further includes a step in which the UE 100 continues to use the first cell reselection parameter for cell reselection until a predetermined period elapses after the second cell is reselected as the serving cell.

The method of controlling the cell reselection according to the second embodiment further includes a step in which the UE 100 receives information specifying the predetermined period, where the information is broadcast from the first cell. The deferring step includes a step of deferring a start of cell reselection using the second cell reselection parameter until a predetermined period designated from the first cell elapses after the second cell is reselected as the serving cell.

The UE 100 according to the second embodiment includes, a receiver configured to receive, when selecting a first cell as a serving cell, a first cell reselection parameter broadcast from the first cell, and a controller configured to reselect, as the serving cell, a second cell different from the first cell using the first cell reselection parameter. The controller defers a start of cell reselection using a second cell reselection parameter broadcast from the second cell until a predetermined period elapses after the second cell is reselected as the serving cell.

In the second embodiment, "deferring the start of cell reselection using the second cell reselection parameter" includes not performing the cell reselection procedure itself, not performing measurement (especially measurement of reception power) of cell reselection procedures, or not applying the second cell reselection parameter (the measurement/reselection procedure may be started/executed).

Example of Operation According to the Second Embodiment

An example of the operation according to the second embodiment will be described. Here, as the cell reselection parameter, Qoffset, which is an offset value used for calculating the ranking Rn of the adjacent cell, is indicated as an example. The ranking Rn is calculated by "Qmeas,n−Qoffset−Qoffsettemp". That is, Qoffset is an offset value applied to the reception power Qmeas,n corresponding to the adjacent cell. By changing the value of Qoffset, the ranking of the adjacent cell can be changed relative to the ranking of the serving cell. For example, when giving a positive offset value to the reception power "Qmeas,n" corresponding to the adjacent cell by Qoffset, the ranking of the adjacent cell is relatively high, and it is possible to prompt cell reselection to the adjacent cell.

Qoffset is configured for each adjacent cell. The eNB 200 broadcasts a plurality of sets of the cell ID which is an identifier of the adjacent cell and Qoffset through the use of SIB. Qoffset according to the second embodiment, that is, Qoffset that is valid within a predetermined time in the adjacent cell may be provided in the SIB as a new information element different from the existing Qoffset that is invalidated in the adjacent cell. Regarding Qoffset as being same as the existing information element, an identifier or a flag indicating that it is valid within a predetermined time also in the adjacent cell may be associated with Qoffset in the SIB. Regarding Qoffset as being same as the existing information element, when information specifying a predetermined period is broadcast, the UE 100 may determine that Qoffset is valid within a predetermined time even in the adjacent cell.

Figure 12:
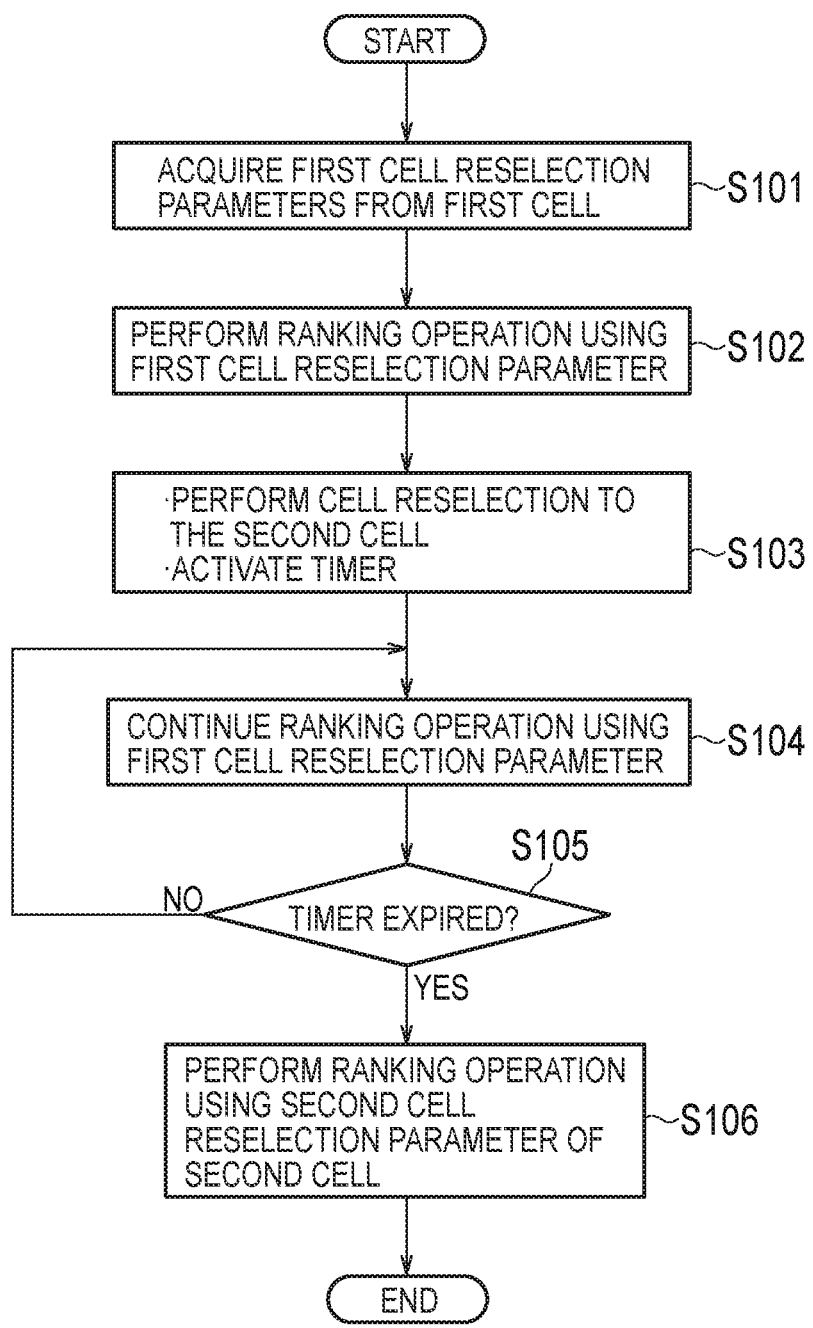
FIG. 12 is a diagram illustrating an operation example of the UE in an idle mode according to the second embodiment.

FIG. 12 is a diagram illustrating an operation example of the UE 100 in the idle mode according to the second embodiment. The UE 100 may be a UE 100 that is in coverage extended by the enhanced coverage function.

As illustrated in FIG. 12, in step S101, the UE 100 acquires the SIB including the first cell reselection parameter (Qoffset) from the first cell that is the current serving cell. Here, it is assumed that the first cell reselection parameter (Qoffset) is a value that relatively increases the ranking of the adjacent cell. The UE 100 may further acquire information (timer value) specifying a predetermined time from the first cell. The timer value may be included in the SIB same as an SIB including the first cell reselection parameter (Qoffset), or may be included in the SIB different from the above SIB.

In step S102, the UE 100 performs a ranking operation using the first cell reselection parameter (Qoffset). The UE 100 calculates the current serving cell ranking Rs and the adjacent cell ranking Rn, and selects a cell having a ranking Rn higher than Rs over a predetermined period (TreselectionRAT) as a target cell (new serving cell). For example, the Rs is calculated by Rs=Qmeas,s+QHyst−Qoffsettemp. Rn is calculated by Rn=Qmeas,n−Qoffset−Qoffsettemp. Here, it is assumed that the second cell that is one of the adjacent cells is selected as a new serving cell by the ranking operation.

In step S103, the UE 100 performs cell reselection from the first cell to the second cell. When performing cell reselection from the first cell to the second cell, the UE 100 starts a timer corresponding to a predetermined time designated from the first cell. The start timing of the timer may be the timing for performing cell reselection to the second cell, for example, the timing for determining cell reselection to the second cell, the timing for completing cell reselection to the second cell, or the like.

In step S104, the UE 100 continues the ranking operation using the first cell reselection parameter (Qoffset) during the timer operation. At this point because the second cell is the current serving cell, when UE 100 uses the first cell reselection parameter (Qoffset) as it is, the ranking of the first cell, which is the adjacent cell, is high. Therefore, the UE 100 may reverse the positive and negative of the first cell reselection parameter (Qoffset) and use it for the ranking operation.

The UE 100 does not acquire (that is, ignore) the second cell reselection parameter (Qoffset) broadcast in the second cell during the timer operation. Alternatively, even when the UE 100 acquires the second cell reselection parameter (Qoffset) broadcast in the second cell during the timer operation, the second cell reselection parameter (Qoffset) is retained or discarded without being applied to the ranking operation.

When the timer has expired (step S105: YES), in step S106, the UE 100 acquires the second cell reselection parameter (Qoffset) from the second cell when it does not have the second cell reselection parameter (Qoffset), and starts the ranking operation using the second cell reselection parameter (Qoffset).

This flow explained an example in which the UE 100 continues the ranking operation using the first cell reselection parameter during the timer operation. However, the UE 100 may interrupt the ranking operation itself during the timer operation, and start the ranking operation using the second cell reselection parameter after the timer expires. Alternatively, the eNB 200 may provide the UE 100 with an exceptional cell reselection parameter that is valid only during the timer operation separately from the normal cell reselection parameter. In this case, the UE 100 may perform a ranking operation using the exceptional cell reselection parameter during the timer operation.

Third Embodiment

The third embodiment will be described mainly with respect to differences from the first and the second embodiment.

Outline of Third Embodiment

In the third embodiment is an embodiment in which when the cell load is high, the cell can be prevented from shutting down by restricting the UE 100 access to the cell. The third embodiment is mainly directed to the UE 100 in an idle mode in the coverage extended by the enhanced coverage function. However, the third embodiment may be directed to the UE 100 in the idle mode in normal coverage.

The UE 100 in an idle mode in the extended coverage is, for example, an eMTC UE and/or an NB-IoT UE. In general, since such a UE 100 stays in the same cell without moving, once access restriction is applied, communication with the network is not possible until the access restriction is cancelled.

To solve such a problem, in the access restriction method according to the third embodiment, the method includes a step in which the eNB 200 broadcasts an advance notification indicating that the access restriction is started after a predetermined time before the eNB 200 starts the access restriction, a step in which the UE 100 receives the advance notification, a step which the UE 100 determines, based on the advance notification, whether to access the eNB 200 within the predetermined time, and a step in which the eNB 200 starts the access restriction after the predetermined time has elapsed since the advance notification was broadcast.

In this way, since the UE 100 can grasp in advance that the access restriction will start by broadcasting an advance notification before the eNB 200 starts access restriction, when the access is needed, the access to the eNB 200 can be performed before the access restriction is started. In addition, due to the advance notification, congestion may occur when a large number of the UEs 100 perform access at the same time within a predetermined time. However, compared to the case where the access restriction is performed without notice, the possibility that data transmission/reception to and from some of the UEs 100 (particularly, eMTC UEs and/or NB-IoT UEs with extended coverage) can be completed can be increased.

The access restriction method according to the third embodiment further includes a step of configuring one or a plurality of access classes in the UE 100, a step in which the eNB 200 broadcasts access class information indicating a specific access class allowing access to the eNB 200 within the predetermined time, a step in which the UE 100 receives the access class information, and a step in which when any of the one or the plurality of access classes configured in the UE 100 is the specific access class, the UE 100 determines that the UE 100 is permitted to access the eNB 200 within the predetermined time. Accordingly, it is possible to suppress the number of UEs 100 that perform access within a predetermined time before the access restriction is started, and to reduce the possibility of congestion. For example, an operation in which the eNB 200 designates an access class corresponding to the eMTC UE and/or the NB-IoT UE and permits the access is also possible. Such a method can be applied without being limited to "within a predetermined time". In other words, the step of configuring one or a plurality of access classes in the UE 100 without assuming the above-described advance notification, the step in which the eNB 200 broadcasts access class information indicating a specific access class that permits access to the eNB 200, the step in which the UE 100 receives access class information, and the step in which the UE 100 determines that the UE 100 is permitted to access the eNB 200 when any of one or a plurality of access classes configured in the UE 100 is a specific access class may be performed alone.

In the third embodiment, a priority order may be associated with an access class. The UE 100 compares the priority order corresponding to the access class information (specific access class) received from eNB 200 with the priority order corresponding to the access class configured in the UE 100. The UE 100 may determine that when the priority order corresponding to the access class configured in UE 100 is equal to or higher than the priority order corresponding to the access class information received from eNB 200, access to the eNB 200 within a predetermined time is permitted. For example, when the priority order of the access classes is defined from "1" to "4", the priority order "2" is configured in the UE 100, and the eNB 200 is broadcasting the priority order "3", since the priority order "2" is higher than the priority order "3", the UE 100 determines that the access is permitted. The eNB 200 according to the third embodiment includes a transmitter configured to broadcast, before an access restriction to restrict access to the eNB 200 from the UE 100 is started, an advance notification indicating that the access restriction is started after a predetermined time, and a controller configured to start the access restriction after the predetermined time has elapsed since the advance notification was broadcast.

The UE 100 according to the third embodiment includes a receiver configured to receive, from the eNB 200, an advance notification indicating that an access restriction to restrict access to the eNB 200 from the UE 100 is started after a predetermined time, and a controller configured to determine, based on the advance notification, whether to access the eNB 200 within the predetermined time.

Example of Operation According to the Third Embodiment

Figure 13:
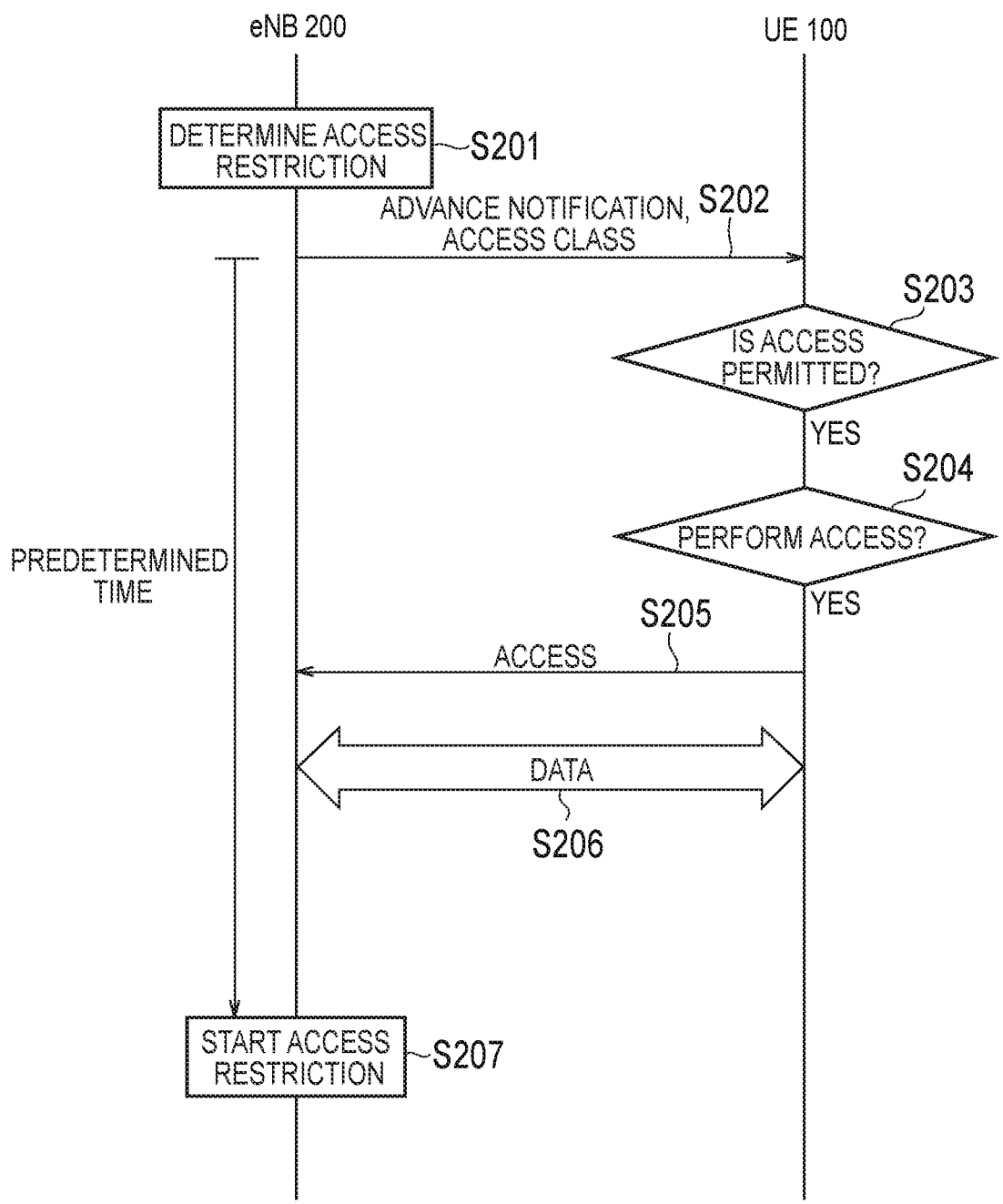
FIG. 13 is a diagram illustrating an example of the operation according to the third embodiment.

An example of the operation according to the third embodiment will be described. FIG. 13 is a diagram illustrating an example of an operation according to the third embodiment. A plurality of access classes is configured in the UE 100. A plurality of access classes may be preconfigured in the UE 100 in the manufacturing stage of the UE 100. A plurality of access classes may be configured in the UE 100 by mounting a nonvolatile storage medium (for example, UICC: universal integrated-circuit card) in which a plurality of access classes are stored in the UE 100. A network (eNB 200, MME 300 or the like) may configure a plurality of access classes in UE 100 through the use of signaling. The access class may be applied to access for special applications. The special applications include, for example, unmanned aircraft. Whether UE 100 applies the access class may be based on a contract for the special application, may be based on whether it has the capability of special application communication, may be based on whether it is going to perform special application communication, or may be based on whether it is going to perform communication in a special application situation (e.g. in flight).

As illustrated in FIG. 13, in step S201, the eNB 200 decides to perform the access restriction according to, for example, the current load of the eNB 200 being high or the load of the eNB 200 being expected to be high in the near future. The eNB 200 may decides an access class that allows access within a predetermined time before the access restriction is started.

In step S202, according to a decision to perform the access restriction, the eNB 200 broadcasts an advance notification indicating that the access restriction is to be started after a predetermined time. The advance notification may include time information indicating a time length of a predetermined time (for example, 100 seconds). Alternatively, the timer value corresponding to the predetermined time may be prescribed in the specification of the LTE system, and the timer value may be preconfigured in the UE 100. The eNB 200 may further broadcast access class information indicating a specific access class that permits access to the eNB 200 within a predetermined time. The specific access class is one or a plurality of access classes permitted by the eNB 200. The advance notification and the access class information may be included in the same SIB or may be included in different SIBs.

In step S203, the UE 100 receives access class information from the eNB 200, and when any of one or a plurality of the access classes configured in the UE 100 is a specific access class, the UE 100 determines that the UE 100 is permitted to access the eNB 200 within a predetermined time. On the other hand, when none of one or a plurality of access classes configured in UE 100 is a specific access class, the UE 100 determines that the UE 100 is not permitted to access the eNB 200 within a predetermined time.

When accessing eNB 200 within a predetermined time is permitted, in step S204, the UE 100 determines, based on the advance notification received from eNB 200, whether access to the eNB 200 should be performed within a predetermined time. As a determination criterion, any one of the following criteria 1) to 3) or a combination of two or more criteria can be used.

1) Whether the UE 100 can generate transmission data. For example, the UE 100 determines whether it can perform access immediately by controlling the application side and generating data a little ahead of schedule.

2) Allowable latency of transmission data. For example, when the UE 100 generates transmission data with small latency allowed for the transmission data, for example, the transmission data corresponding to an application with high immediacy, it determines that the access should be performed immediately.

3) Whether permission information, based on subscriber information, configured in advance exists in the UE 100. The permission information may include the access class described above.

When the UE 100 determines that access to the eNB 200 should be performed within a predetermined time, the process proceeds to step S205. Note that the order of step S203 and step S204 may be reversed.

In step S205, the UE 100 accesses the eNB 200. For example, the UE 100 performs an attach procedure to the network. The attach procedure may involve a random access procedure.

In step S206, the UE 100 transmits data to the eNB 200. The UE 100 may receive data from the eNB 200. When the data transmission/reception is completed, the UE 100 may be detached from the network (and release the RRC connection).

In step S207, the eNB 200 starts the access restriction when a predetermined time has elapsed since the advance notification was broadcast. When the access restriction is started, the eNB 200 rejects access from all the UEs 100. Alternatively, eNB 200 may reject access from the UEs 100 of some access classes, or may broadcast information specifying an access class for which access is prohibited.

Other Embodiments

In the above-described embodiments, the LTE system is exemplified as the mobile communication system. However, the present invention is not limited to the LTE system. The operation according to the above-described embodiments may be applied to a mobile communication system (for example, a fifth generation mobile communication system) other than the LTE system.

A program for causing a computer to execute each process performed by the UE 100 and the eNB 200 may be provided. The program may also be recorded on a computer readable medium. Use of a computer readable medium makes it possible to install a program in a computer. Here, the computer readable medium on which the program is recorded may be a non-transitory recording medium. The non-transitory recording medium is not particularly limited, but it may be a recording medium such as CD-ROM or DVD-ROM, for example. A chip set constituted by a memory storing a program for executing respective processes performed by the UE 100 and the eNB 200 and a processor executing the program stored in the memory may be provided.

APPENDIX 1

(1. Introduction)

The new work item on Even further enhanced MTC for LTE (eFeMTC) was approved in RAN #75 and the WID identifies the several objectives that RAN2 should consider as the leading WG. The objective is to specify the following improvements for machine-type communications for BL/CE UEs. [ . . . ]

Improved Latency:

[ . . . ]

Support early data transmission [RAN2 lead, RAN1, RAN3]

Evaluate power consumption/latency gain and specify necessary support for DL/UL data transmission on a dedicated resource during the Random Access procedure (after PRACH transmission and before the RRC connection setup is completed) at least in the RRC Suspend/Resume case.

Improved Power Consumption:

[ . . . ]

Relaxed monitoring for cell reselection [RAN2 lead, RAN4]

Enable relaxed UE monitoring for cell (re)selection e.g. by (re)configuration.

Support efficient transition between CE mode and non-CE for non-BL UE [RAN2 lead]

Enable CE mode operation (i.e., narrowband/wideband) for power saving purposes.

This work is started after RAN #76 if the work is not completed already in Rel-14.

[ . . . ]

Improved Load Control:

Improved access/load control of idle mode UEs [RAN2 lead]

E.g. CE-level-based access class barring

In this appendix, the considerations for these improvements are discussed.

(2. Discussion)

(2.1 Improved Latency—Early Data Transmission)

Although the WID clearly states: "Evaluate power consumption/latency gain and specify necessary support for DL/UL data transmission on a dedicated resource during the Random Access procedure (after PRACH transmission and before the RRC connection setup is completed) at least in the RRC Suspend/Resume case.", the enhanced latency performance with early data transmission may lead to additional power consumption considering the various MTC device implementations. In case additional power consumption becomes necessary in some MTC implementations, the UE should be allowed to choose the legacy RACH procedure, i.e., non-early data transmission mode, to avoid the burden for legacy use cases.

Proposal 1: The solutions for early data transmission should minimize the additional power consumption; e.g., the UE should be allowed to choose the legacy RACH procedure, i.e., "non-early data transmission mode".

The WID also mentions the early data transmission should be performed after Msg1 and before Msg5, i.e., the candidates for the enhancements are Msg2, Msg3 and Msg4. On the other hand, it could be expected that the some control signaling may be allowed to be sent even before Msg2 and after Msg4.

Proposal 2: It should not be required for the control signaling associated with the early data transmission to be sent over Msg 2, Msg 3 or Msg 4.

It's not identified in the WID whether the data for early transmission is assumed as a small packet, a large size data and/or both. If only the small data is assumed, for example, it may be better for the UE to transition to RRC IDLE as soon as the data transmission is completed, e.g., even within the RACH procedure. Anyhow, it could be considered that the solution will be different depending on the data size for early transmission. So, RAN2 should first discuss and determine the assumption for data size.

Proposal 3: RAN2 should discuss the data size assumed for early transmission, i.e., a small packet, a large packet or both.

The WID does not clearly mentioned whether the early data transmission can be initiated only in the contention-based RACH procedure, the contention-free RACH procedure or both. The assumptions for the solution are different between the two procedures, e.g., if the PDCCH order can be assumed or not. So, RAN2 should clarify which RACH procedure is the assumption for early data transmission.

Proposal 4: RAN2 should discuss whether the early data transmission is applicable to the contention-based RACH procedure, the contention-free RACH procedure or both.

Figure 14:
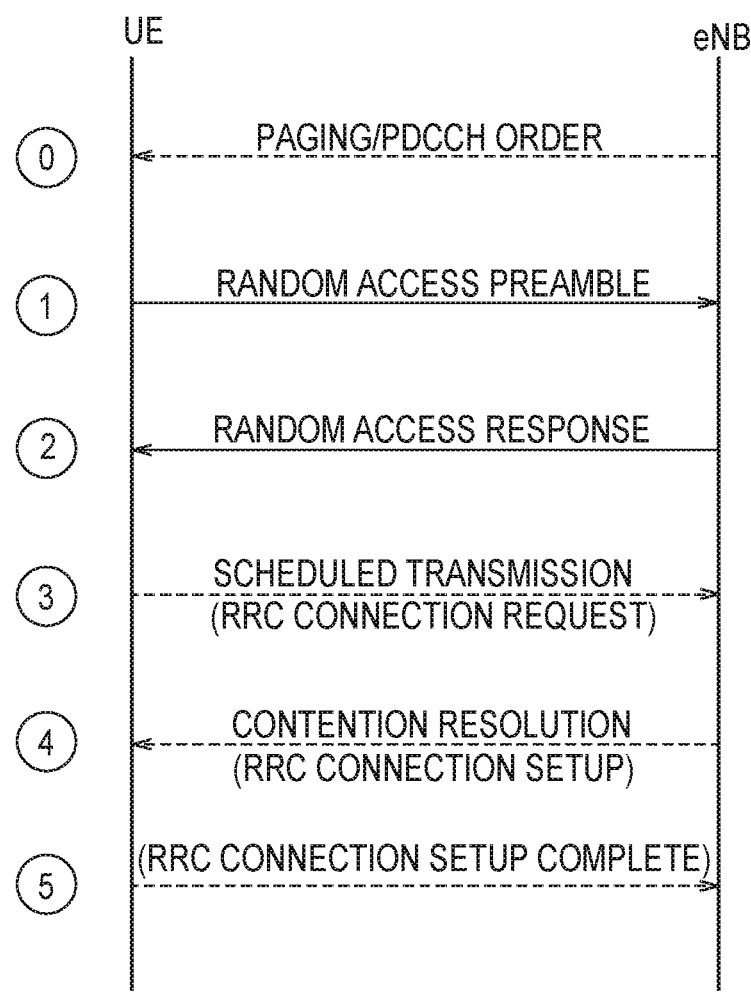
FIG. 14 is a diagram related to the appendix.

FIG. 14 shows a general RACH procedure (Contention-based/-free).

(2.2. Improved Power Consumption—Relaxed Monitoring for Cell Reselection)

The WID explains the mechanism to "Enable relaxed UE monitoring for cell (re)selection e.g. by (re)configuration". Regardless of necessity of (re)configuration, stationary UEs should be allowed to perform relaxed monitoring since cell reselections are rare occurrences. When the (re) configuration is necessary as intended in the WID, some UE assistance information may be necessary, e.g., a number of cell reselections reporting, a stationary UE indication etc., since the network may not know whether the IDLE mode UE performs cell reselection or not.

Proposal 5: It should be configurable whether stationary UEs are allowed to operate under relaxed monitoring for cell reselection.

(2.3. Improved Load Control—Access/Load Control of Idle Mode UEs)

It is also stated in the WID that, "E.g. CE-level-based access class barring". This example implies that a UE with a specific access class may be denied access to the network when it's operating under a specific CE level. For example, the UE with access class 3 and in CE level 2 cannot initiate the RRC Connection Establishment/Resumption, if the eNB broadcasts a certain indication e.g., in SIB2. It's indeed worth considering such a candidate solution.

On the other hand, the statement in the WID "load control of idle mode UEs" implies certain functionality that may be used to avoid using Access Control as much as possible. In particular, a mechanism for load control of IDLE UEs may achieve the necessary result from the network's load balancing perspective without prohibiting the use of a cell with AC barring in case this CE-level cell is the only suitable cell available to the UE. For example, the current specification supports the E-UTRAN Inter-frequency Redistribution procedure, known as MCLD, which utilizes the reselection priority handling for better load balancing. However, the UE in CE should apply the ranking for cell reselection, i.e., the procedure specified under "Reselection for enhanced coverage". So how load balancing in CE should work is not yet clear. Therefore, it may be worth discussing further how to achieve a better load balancing among the network.

Proposal 6: RAN2 should discuss how to achieve the load balancing of IDLE UEs among the network, in addition to the access barring in a specific cell.

APPENDIX 2

(1. Introduction)

RAN2 #99 started the discussion on the access/load control of idle mode UEs in Even further enhanced MTC for LTE (eFeMTC), but no agreement was reached on whether to introduce the CE-based access barring since its unfairness problem is observed.

In this appendix, the details of CE-based access barring and the load balancing mechanism are discussed.

(2. Discussion)

(2.1. CE-Based Access Barring)

The CE-based access barring is proposed by several companies, due to it's stated in the WID as an example of possible solutions. The idea is simply to extend the current concept of access class barring in order to restrict the accesses from UEs in each CE levels because the major impact on overload is expected to come from the repetitions for enhanced coverage.

It could also be considered as a kind of RAN-level control for the CE Authorization, which was introduced in Rel-14 as "Restriction of use of Enhanced Coverage". The existing access barring mechanisms in RAN, such as EAB and ACDC etc, to provide fast RAN-level control but they were not associated with CE. On the other hand, the CE Authorization restricts the access from the UE in CE but is enabled only at ATTACH or TAU, i.e., it rather provides slow control of cell loads. So, the CE-based access barring will be the solution to avoid the worst case, e.g., NW hang-up/shutdown due to sudden overload.

Observation 1: CE-based access barring will be beneficial to avoid the extremely overloaded condition.

However, it was not agreed to be introduced so far, since it was observed the unfairness among the UEs with the same access class, as pointed out. The unfairness problem occurs when the UE, which is authorized by the NW, e.g., due to its subscription, cannot access the cell due while camped in CE mode while another UE with the same access class in normal coverage are allowed to initiate access. Additionally, the UE which is restricted has no option to reselect other cells, i.e., the UE shall camp on the current serving cell and wait for removal of the restriction, as it's the current concept of access control mechanism. Considering that most MTC devices are stationary in nature, it's likely that such a device will not have access at all, unless the access restriction is removed. So, the CE-based access barring may result in increased customer dissatisfaction with the service, especially for customers that may not be aware of the differences between CE and non-CE modes.

Observation 2: CE-based access barring may cause serious compliant due to unfairness among users.

With the above understanding of the benefits and drawbacks, it's eventually up to NW implementation and/or deployment policy on whether/how to use the functionality, even if the CE-based access barring is introduced. So, RAN2 should discuss the usefulness of the functionality from the perspectives of not only NW operation but also user experience.

Proposal 1: RAN2 should discuss whether the CE-based access barring is really useful, from the perspectives of NW operation and user experience.

(2.2. Idle Mode Load Balancing)

As an option to access barring RAN2 should also consider the using load balancing mechanisms for idle mode UEs which already contain various configurable parameters i.e., the absolute priority, the dedicated priority, the offsets and the redistribution procedure. However, they were not introduced with the use case for UE in CE mode since they only follow the ranking procedure.

Regardless of whether the CE-based access barring is introduced, i.e., Proposal 1, RAN2 should at least consider if load balancing of idle mode UEs can provide sufficient control to reduce the burden on the network, before any access control is applied.

Proposal 2: RAN2 should discuss the use of idle mode load balancing mechanisms, before jumping to the conclusion that access restriction is the only viable solution.

Assuming Proposal 2 is acceptable, the existing load balancing mechanisms for inter-frequency and/or intra-frequency deployments are discussed in the following sections.

(2.2.1. Cell/Frequency-Specific Offsets)

The UE in normal coverage applies the ranking mechanism for intra-frequency and equal priority inter-frequency cell reselection. In addition, the UE in CE only follows the ranking mechanism regardless of whether intra-frequency or inter-frequency cell reselection. The criterion R is defined as:

$$R_s = Q_{meas,s} + Q_{Hyst} - Q\text{offset}_{temp} + Q\text{offset}_{SCPTM}$$

$$R_n = Q_{meas,n} - Q\text{offset} - Q\text{offset}_{temp} + Q\text{offset}_{SCPTM} \quad \text{[formula 1]}$$

$Q_{offset}$ is equal to $Q_{offsets,n}$ for intra-frequency and $Q_{offsets,n}$ plus $Q_{offset,n}$ for inter-frequency. $Q_{offset}$, ranged between −24 dB and +24 dB, may be used for the network optimizations including the load balancing between cells and/or frequencies as a static control manner.

Observation 3: The existing Qoffset may be used for static load balancing.

However, the use case for improved access/load control on this WI is assumed to need dynamic control, since the example of solution in WID i.e., CE-based access barring, implies the access barring is applied temporarily.

Proposal 3: RAN2 should agree that the solutions for improved access/load control are assumed to require dynamic control of idle mode UEs, i.e., applicable for a short term.

The load balancing with $Q_{offset}$ is not intended for such a dynamic control since the change of configuration may need to consider other configurations, e.g., the absolute priority for UEs in normal coverage, and also affect the neighbor cells' system information. So, some enhancements will be necessary if the solution relies on $Q_{offset}$ proposed.

Observation 4: $Q_{offset}$-based may need to be enhanced, if it's a possible solution for the improved access/load control.

(2.2.2. Inter-Frequency Load Redistribution)

The inter-frequency redistribution procedure was introduced in Rel-13 for load balancing in multi-carrier deployments. It redistributes the UEs to another frequency with a network-defined probability. The choice of UEs for redistribution is according to IMSI of UEs, so it ensures not perfect but relatively fairness of UEs. The trigger is designed for two use cases, i.e., the continuous triggering and the one-shot triggering with Paging, so the inter-frequency redistribution procedure has native support of dynamic load control.

Observation 5: The inter-frequency redistribution procedure is NW-controlled method with a good fairness of UEs and the dynamic load control of idle mode UEs.

However, a couple of problems could be seen in this procedure.

Only applicable to inter-frequency redistribution; It could be assumed that the UE in CE only detects less number of other frequencies for redistribution, since the best-ranked cell for this UE still needs the enhanced coverage.

Using the highest-priority concept for the redistribution target cell/frequency; It means the current mechanism is applicable to only UEs in normal coverage, since the UE in CE disregards the priority and follows the ranking mechanism.

Proposal 4: RAN2 should agree to enhance the inter-frequency redistribution procedure, i.e., MCLD introduced in Rel-13, for the improved load control.

APPENDIX 3

(1. Introduction)

The WID states to specify the functionality for improved access/load control of idle mode UEs:

Improved Load Control:

Improved access/load control of idle mode UEs [RAN2 lead]

E.g. CE-level-based access class barring

In terms of load control of idle mode UEs, there is already variety of mechanisms for load balancing, e.g., absolute priority, Qoffset and so on, but some of them are only applicable to the UEs in normal coverage. It's still in-line with the WI objective to support the existing mechanism(s) for CE.

The E-UTRAN Inter-frequency Redistribution procedure, which was introduced in Rel-13, is the reliable mechanism for load balancing, by means of moving a portion of idle mode UEs to neighbor cells. However, it's currently available only for UEs in normal coverage.

In this appendix, how to extend the existing E-UTRAN Inter-frequency Redistribution procedure to CE is discussed.

(2. Discussion)

The load balancing is one of key challenges to ensure stability, reliability and customer satisfaction for the network operation. Especially, the design and control of idle mode load distribution are important since it directly affects access failures and call drops.

One of the problems in load imbalance/congestion due to access from CE comes from the simplified cell reselection procedure, i.e., the UE in CE only performs the ranking. It makes sense always to seek a better cell in terms of radio condition, since the access with many repetitions comes expensive. At the same time, it potentially causes unbalanced load since all UEs in a certain area will reselect the same cell, even if there are other cells. It results in the heavily congestion in one cell and the lightly load in another cell. Under this condition, if the congested cell carries out the access restriction, it actually means the network capacity degradation. As one of options, the E-UTRAN Inter-frequency Redistribution procedure would be the beneficial toolbox, since it makes a portion of idle mode UEs to reselect another cell even if these UEs are in a certain geographical area. It would reduce the number of congestions/access barrings by the redistribution beforehand. Thus, it's still a possible solution for the improved access/load control of this WI.

Proposal 7: RAN2 should agree that the existing E-UTRAN Inter-frequency Redistribution procedure is enhanced to work in enhanced coverage.

As implied in Proposal 7, the existing E-UTRAN Inter-frequency Redistribution procedure works only for the idle mode UEs in normal coverage. The issue is the mechanism relies on the highest priority concept, i.e., higher than eight absolute priority, for the cell reselection while there is no such a concept in CE.

Observation 1: The E-UTRAN Inter-frequency Redistribution procedure relies on the highest priority concept to reselect the target cell/frequency. FIG. 15 shows existing redistribution process and that problem.

The possible solution is either a) to introduce the priority-handling concept in CE or b) to introduce the ranking-based reselection in the redistribution process. Needless to say, Solution a) needs the fundamental change in whole design of cell reselection procedure in CE, while Solution b) will be less impacts to the current specification. In this sense, Solution b) is considered as preferable.

Proposal 8: RAN2 should agree to specify the ranking-based redistribution for UE in CE, in addition to the existing priority-based one for UE in normal coverage.

If Proposal 8 is agreeable, it should be considered how to emulate the priority-handling outcome in the ranking process. It's noticed there was similar issue In Rel-14 when SC-PTM was introduced in FeMTC and eNB-IoT, and the solution was to introduce in R-criteria $Qoffset_{SCPTM}$ that may be configured with "infinity". The same concept could be reused in Rel-15, i.e., to introduce $Qoffset_{RedistrCE}$ that is configured with "infinity" and only applied when the redistribution process is triggered in CE.

Proposal 9: RAN2 should agree to introduce in R-criteria a new $Qoffset_{RedistrCE}$ that is configured with "infinity" and only applied when the redistribution is triggered in CE.

Another point that should be discussed is whether the redistribution parameters should be provided per CE Mode (A/B); whereby the parameters consist of the redistribution factor (probability), timer (T360), cell list (for cell specific prioritization) and/or $Qoffset_{RedistrCE}$ (if Proposal 9 is agreeable). Considering the solution example in WID, i.e., "CE-level-based access class barring", the solution is expected to have a precise control capability due to CEL. The expectation is considered also applicable to the load balancing mechanism, while it may be per CE Mode control, and such a precise control will be beneficial since the NW may optimize the redistribution of idle mode UEs according to its load level.

Proposal 10: RAN2 should agree that the existing redistribution parameters and the new $Qoffset_{RedistrCE}$ are provided for each CE Modes.

Taking into account the above proposals, the possible specification changes are provided below.

APPENDIX 4

TS 36.304

Examples of changes to TS 36.304 are provided as follows.

First Change

The cell-ranking criterion Rs for serving cell and Rn for neighboring cells, for 5.2.4.6 Intra-frequency and equal priority inter-frequency Cell Reselection criteria are defined by below.

$$R_s = Q_{meas,s} + Q_{Hyst} - Qoffset_{temp} + Qoffset_{SCPTM} + Qoffset_{RedistrCE}$$

$$R_n = Q_{meas,n} - Qoffset - Qoffset_{temp} + Qoffset_{SCPTM} + Qoffset_{RedistrCE}$$

Wherein:

Q: RSRP measurement quantity used in cell reselections.

Qoffset:

For intra-frequency: Equals to $Qoffset_{s,n}$, if $Qoffset_{s,n}$ is valid, otherwise this equals to zero.

For inter-frequency: Except for NB-IoT, equals to $Qoffset_{s,n}$ plus $Qoffset_{frequency}$, if $Qoffset_{s,n}$ is valid, otherwise this equals to $Qoffset_{frequency}$.

For NB-IoT equals to $QoffsetDedicated_{frequency}$ for any frequency other than the frequency of the dedicated frequency offset, if $QoffsetDedicated_{frequency}$ is valid, otherwise this equals to $Qoffset_{frequency}$ (if $QoffsetDedicated_{frequency}$ is valid $Qoffset_{frequency}$ is not used).

$Qoffset_{temp}$: Offset temporarily applied to a cell.

$Qoffset_{SCPTM}$: Offset temporarily applied to an SC-PTM frequency as specified below. The offset is applied to all cells on the SC-PTM frequency. If $Qoffset_{SCPTM}$ is valid, Qoffset for inter-frequency neighbor cells is not used.

$Qoffset_{RedistrCE}$: For UE in enhanced coverage and NB-IoT, offset applied to a current redistribution target frequency/cell while T360 is running, and until completion of E-UTRAN Inter-frequency Redistribution procedure specified in 5.2.4.10 if triggered on T360 expiry/stop.

If the NB-IoT UE or UE in enhanced coverage is capable of SC-PTM reception and is receiving or interested to receive an MBMS service and can only receive this MBMS service while camping on a frequency on which it is provided (SC-PTM frequency), the UE considers QoffsetSCPTM to be valid during the MBMS session as long as the either of following condition is fulfilled.

SIB15 (or SIB15-NB) of the serving cell indicates for that frequency one or more MBMS SAIs included in the MBMS User Service Description (USD) of this service.

Or,

SIB15 (or SIB15-NB) is not broadcast in the serving cell and that frequency is included in the USD of this service.

NOTE: UE should search for a higher ranked cell on another frequency for cell reselection as soon as possible after the UE stops using $Qoffset_{SCPTM}$.

The UE shall perform ranking of all cells that fulfil the cell selection criterion S, which is defined in 5.2.3.2 (5.2.3.2a for NB-IoT), but may exclude all CSG cells that are known by the UE not to be CSG member cells.

The cells shall be ranked according to the R criteria specified above, deriving $Q_{meas,n}$ and $Q_{meas,s}$ and calculating the R values using averaged RSRP results.

If a cell is ranked as the best cell the UE shall perform cell reselection to that cell. If this cell is found to be not-suitable, the UE shall behave according to subclause 5.2.4.4.

In all cases, the UE shall reselect the new cell, only if the following conditions are met.

The new cell is better ranked than the serving cell during a time interval $Treselection_{RAT}$.

More than 1 second has elapsed since the UE camped on the current serving cell.

When the UE uses infinite dBs for $Qoffset_{SCPTM}$, the UE shall use $Qoffset_{SCPTM}$ zero and rank the cells on the SC-PTM frequency(ies) only first. If the UE cannot find a suitable cell on an SC-PTM frequency, the UE shall rank the cells on all frequencies.

5.2.4.6a Reselection for Enhanced Coverage

Ranking as defined in sub-clause 5.2.4.6 is applied for intra-frequency and inter-frequency cell reselection (irrespective of configured frequency priorities, if any) while the UE is in enhanced coverage.

Second Change (No Change)

5.2.4.10 E-UTRAN Inter-Frequency Redistribution Procedure

If a UE is redistribution capable and redistributionServingInfo is included in SystemInformationBlockType3 and redistributionInterFreqInfo is included in SystemInformationBlockType5 and the UE is not configured with dedicated priorities and if T360 is not running and if redistrOnPagingOnly is not present in SystemInformationBlockType3; or
if T360 expires and if redistrOnPagingOnly is not present in SystemInformationBlockType3; or
if Paging message is received and the redistributionIndication is included:
Perform inter-frequency measurement as specified in 5.2.4.2;
Once measurement results are available perform redistribution target selection as specified in 5.2.4.10.1;
Start T360.

The UE shall stop T360 and cease to consider a frequency or cell to be redistribution target when the following.
the UE enters RRC CONNECTED state; or
T360 expires; or
if Paging message is received and the redistributionIndication is included while T360 is running; or
the UE reselects a cell not belonging to redistribution target.

5.2.4.10.1 Redistribution Target Selection

The UE shall compile a sorted list of one or more candidate redistribution targets, and for each candidate entry [j] a valid redistrFactor[j], in which entries are added in increasing index order starting with index 0 as follows.

for the serving frequency (redistributionFactorServing is included in SystemInformationBlockType3 whenever redistribution is configured):
the serving cell if redistributionFactorCell is included; otherwise the serving frequency;
In both cases, redistrFactor[0] is set to redistributionFactorServing.
for each entry in InterFreqCarrierFreqList and subsequent for each entry in InterFreqCarrierFreqListExt:
the cell ranked as the best cell on this frequency according to section 5.2.4.6 if redistributionNeighCellList is configured and includes this cell;
otherwise, the concerned frequency if redistributionFactorFreq is configured and if at least one cell on the frequency fulfills the cell selection criterion S defined in 5.2.3.2;
If the cell is included, redistrFactor[j] is set to the corresponding redistributionFactorCell; If the frequency is included, redistrFactor[j] is set to the corresponding redistributionFactorFreq.

The UE shall choose a redistribution target as follows.

If ueID≤200·redistrRange[0], the UE shall choose the frequency or the cell corresponding to redistrFactor[0] as its redistribution target or;

$$200 \cdot \Sigma_{j=0}^{j=i-1} \text{redistrRange}[j] < \text{ueID} \leq 200 \cdot \Sigma_{j=0}^{j=i} \text{redistrRange}[j] \qquad \text{[formula 2]}$$

If the above, then the UE shall choose the frequency or cell corresponding to redistrFactor[i] as its redistribution target.

ueID=(IMSI mod 100)·2+1;

If there are no redistribution candidates apart from the serving frequency or cell, the redistrRange[0]=1.

Otherwise, the redistrRange[i] of E-UTRAN frequency or cell is defined by:

$$\text{redistrRange}[i] = \frac{\text{redistrFactor}[i]}{\sum_{j=0}^{j=(maxCandidates-1)} \text{redistrFactor}[j]} \qquad \text{[formula 3]}$$

Where: maxCandidates is the total number of frequencies/cells with valid redistrFactor[j].

TS 36.331

Examples of changes to TS 36.331 are provided as follows.

First Change

SystemInformationBlockType3

The IE SystemInformationBlockType3 contains cell reselection information common for intra-frequency, inter-frequency and/or inter-RAT cell re-selection (i.e. applicable for more than one type of cell re-selection but not necessarily all) as well as intra-frequency cell re-selection information other than neighboring cell related.

SystemInformationBlockType3 Information Element

```
-- ASN1START
SystemInformationBlockType3 ::=    SEQUENCE {
    cellReselectionInfoCommon    SEQUENCE {
        q-Hyst           ENUMERATED {
            dB0, dB1, dB2, dB3, dB4, dB5, dB6, dB8, dB10,
```

```
                    dB12, dB14, dB16, dB18, dB20, dB22, dB24},
    speedStateReselectionPars  SEQUENCE {
      mobilityStateParameters   MobilityStateParameters,
      q-HystSF         SEQUENCE {
        sf-Medium         ENUMERATED {
                    dB-6, dB-4, dB-2, dB0},
        sf-High           ENUMERATED {
                    dB-6, dB-4, dB-2, dB0}
      }
    }                    OPTIONAL   -- Need OP
  },
  cellReselectionServingFreqInfo      SEQUENCE {
    s-NonIntraSearch       ReselectionThreshold   OPTIONAL,   -- Need OP
    threshServingLow       ReselectionThreshold,
    cellReselectionPriority       CellReselectionPriority
  },
  intraFreqCellReselectionInfo    SEQUENCE {
    q-RxLevMin       Q-RxLevMin,
    p-Max        P-Max       OPTIONAL,       -- Need OP
    s-IntraSearch       ReselectionThreshold       OPTIONAL, -- Need OP
    allowedMeasBandwidth     AllowedMeasBandwidth OPTIONAL, -- Need OP
    presenceAntennaPort1    PresenceAntennaPort1,
    neighCellConfig   NeighCellConfig,
    t-ReselectionEUTRA    T-Reselection,
    t-ReselectionEUTRA-SF    SpeedStateScaleFactors OPTIONAL -- Need OP
  },
  ...,
  lateNonCriticalExtension          OCTET       STRING (CONTAINING
SystemInformationBlockType3-v10j0-IEs) OPTIONAL,
  [[ s-IntraSearch-v920         SEQUENCE {
    s-IntraSearchP-r9          ReselectionThreshold,
    s-IntraSearchQ-r9          ReselectionThresholdQ-r9
  }                   OPTIONAL,   -- Need OP
  s-NonIntraSearch-v920      SEQUENCE {
    s-NonIntraSearchP-r9       ReselectionThreshold,
    s-NonIntraSearchQ-r9       ReselectionThresholdQ-r9
  }                   OPTIONAL,    -- Need OP
  q-QualMin-r9          Q-QualMin-r9         OPTIONAL,         -- Need OP
  threshServingLowQ-r9       ReselectionThresholdQ-r9 OPTIONAL -- Need OP
  ]],
  [[ q-QualMinWB-r11      Q-QualMin-r9    OPTIONAL -- Cond WB-RSRQ
  ]],
  [[    q-QualMinRSRQ-OnAllSymbols-r12     Q-QualMin-r9    OPTIONAL --
Cond RSRQ
  ]],
  [[   cellReselectionServingFreqInfo-v1310 CellReselectionServingFreqInfo-v1310
OPTIONAL,       -- Need OP
    redistributionServingInfo-r13     RedistributionServingInfo-r13   OPTIONAL,
--Need OR
    cellSelectionInfoCE-r13     CellSelectionInfoCE-r13 OPTIONAL, -- Need OP
    t-ReselectionEUTRA-CE-r13      T-ReselectionEUTRA-CE-r13 OPTIONAL --
Need OP
  ]],
  [[ cellSelectionInfoCE1-r13    CellSelectionInfoCE1-r13 OPTIONAL -- Need OP
  ]],
  [[   cellSelectionInfoCE1-v1360     CellSelectionInfoCE1-v1360 OPTIONAL --
Cond QrxlevminCE1
  ]]
  [[   redistributionServingInfoCE-r15 RedistributionServingInfo-r13 OPTIONAL,
--Need OR
    redistributionServingInfoCE1-r15 RedistributionServingInfo-r13    OPTIONAL,
--Need OR
    q-offsetRedistrCE        ENUMERATED {Infinity}     OPTIONAL, --Need OP
    q-offsetRedistrCE1         ENUMERATED {Infinity}     OPTIONAL, --Need OP
  ]]
}
RedistributionServingInfo-r13 ::=   SEQUENCE {
  redistributionFactorServing-r13   INTEGER(0..10),
  redistributionFactorCell-r13     ENUMERATED {true}     OPTIONAL, --Need OP
  t360-r13         ENUMERATED {min4, min8, min16, min32,infinity,
              spare3,spare2,spare1},
  redistrOnPagingOnly-r13    ENUMERATED {true}    OPTIONAL --Need OP
}
CellReselectionServingFreqInfo-v1310 ::= SEQUENCE {
  cellReselectionSubPriority-r13     CellReselectionSubPriority-r13
}
-- Late non critical extensions
SystemInformationBlockType3-v10j0-IEs ::= SEQUENCE {
  freqBandInfo-r10       NS-PmaxList-r10     OPTIONAL, -- Need OR
```

```
multiBandInfoList-v10j0    MultiBandInfoList-v10j0 OPTIONAL, -- Need OR
nonCriticalExtension    SystemInformationBlockType3-v1010-IEs    OPTIONAL
}
SystemInformationBlockType3-v1010-IEs ::= SEQUENCE {
freqBandInfo-v1010         NS-PmaxList-v1010       OPTIONAL, -- Need OR
multiBandInfoList-v1010    MultiBandInfoList-v1010 OPTIONAL, -- Need OR
nonCriticalExtension       SEQUENCE { }            OPTIONAL
}
-- ASN1STOP
```

SystemInformationBlockType5

The IE SystemInformationBlockType5 contains information relevant only for inter-frequency cell re-selection i.e. information about other E UTRA frequencies and inter-frequency neighbouring cells relevant for cell re-selection. The IE includes cell re-selection parameters common for a frequency as well as cell specific re-selection parameters.
SystemInformationBlockType5 Information Element

```
-- ASN1START
SystemInformationBlockType5 ::= SEQUENCE {
    interFreqCarrierFreqList    InterFreqCarrierFreqList,
    ...,
        lateNonCriticalExtension    OCTET    STRING    (CONTAINING
SystemInformationBlockType5-v8h0-IEs)    OPTIONAL,
    [[ interFreqCarrierFreqList-v1250 InterFreqCarrierFreqList-v1250    OPTIONAL, --
Need OR
        interFreqCarrierFreqListExt-r12    InterFreqCarrierFreqListExt-r12 OPTIONAL --
Need OR
    ]],
    [[    interFreqCarrierFreqListExt-v1280    InterFreqCarrierFreqListExt-v1280
OPTIONAL -- Need OR
    ]],
    [[  interFreqCarrierFreqList-v1310    InterFreqCarrierFreqList-v1310    OPTIONAL,
-- Need OR
        interFreqCarrierFreqListExt-v1310    InterFreqCarrierFreqListExt-v1310    OPTIONAL
-- Need OR
    ]],
    [[ interFreqCarrierFreqList-v1350    InterFreqCarrierFreqList-v1350    OPTIONAL, --
Need OR
        interFreqCarrierFreqListExt-v1350    InterFreqCarrierFreqListExt-v1350    OPTIONAL
-- Need OR
    ]],
    [[    interFreqCarrierFreqListExt-v1360    InterFreqCarrierFreqListExt-v1360
OPTIONAL -- Need OR
    ]],
    [[scptm-FreqOffset-r14       INTEGER (1..8)       OPTIONAL -- Need OP
    ]]
}
SystemInformationBlockType5-v8h0-IEs ::= SEQUENCE {
    interFreqCarrierFreqList-v8h0    SEQUENCE    (SIZE    (1..maxFreq))    OF
InterFreqCarrierFreqInfo-v8h0  OPTIONAL, -- Need OP
    nonCriticalExtension    SystemInformationBlockType5-v9e0-IEs    OPTIONAL
}
SystemInformationBlockType5-v9e0-IEs ::= SEQUENCE {
    interFreqCarrierFreqList-v9e0    SEQUENCE    (SIZE    (1..maxFreq))    OF
InterFreqCarrierFreqInfo-v9e0    OPTIONAL, -- Need OR
    nonCriticalExtension    SystemInformationBlockType5-v10j0-IEs    OPTIONAL
}
SystemInformationBlockType5-v10j0-IEs :: = SEQUENCE {
    interFreqCarrierFreqList-v10j0    SEQUENCE    (SIZE    (1..maxFreq))    OF
InterFreqCarrierFreqInfo-v10j0    OPTIONAL, -- Need OR
    nonCriticalExtension    SystemInformationBlockType5-v1010-IEs    OPTIONAL
}
SystemInformationBlockType5-v1010-IEs :: = SEQUENCE {
    interFreqCarrierFreqList-v1010    SEQUENCE    (SIZE    (1..maxFreq))    OF
InterFreqCarrierFreqInfo-v1010    OPTIONAL, -- Need OR
    nonCriticalExtension SEQUENCE { }       OPTIONAL
}
InterFreqCarrierFreqList    ::=    SEQUENCE    (SIZE    (1..maxFreq))    OF
InterFreqCarrierFreqInfo
InterFreqCarrierFreqList-v1250    ::=    SEQUENCE    (SIZE    (1..maxFreq))    OF
InterFreqCarrierFreqInfo-v1250
InterFreqCarrierFreqList-v1310    ::=    SEQUENCE    (SIZE    (1..maxFreq))    OF
InterFreqCarrierFreqInfo-v1310
InterFreqCarrierFreqList-v1350    ::=    SEQUENCE    (SIZE    (1..maxFreq))    OF
InterFreqCarrierFreqInfo-v1350
InterFreqCarrierFreqListExt-r12    ::=    SEQUENCE    (SIZE    (1..maxFreq))    OF
InterFreqCarrierFreqInfo-r12
```

```
InterFreqCarrierFreqListExt-v1280  ::= SEQUENCE (SIZE    (1..maxFreq))   OF
InterFreqCarrierFreqInfo-v10j0
InterFreqCarrierFreqListExt-v1310  ::= SEQUENCE (SIZE    (1..maxFreq))   OF
InterFreqCarrierFreqInfo-v1310
InterFreqCarrierFreqListExt-v1350  ::= SEQUENCE (SIZE    (1..maxFreq))   OF
InterFreqCarrierFreqInfo-v1350
InterFreqCarrierFreqListExt-v1360  ::= SEQUENCE (SIZE    (1..maxFreq))   OF
InterFreqCarrierFreqInfo-v1360
InterFreqCarrierFreqInfo ::= SEQUENCE {
  dl-CarrierFreq       ARFCN-ValueEUTRA,
  q-RxLevMin           Q-RxLevMin,
  p-Max                P-Max          OPTIONAL,    -- Need OP
  t-ReselectionEUTRA   T-Reselection,
  t-ReselectionEUTRA-SF    SpeedStateScaleFactors    OPTIONAL,  -- Need OP
  threshX-High         ReselectionThreshold,
  threshX-Low          ReselectionThreshold,
  allowedMeasBandwidth     AllowedMeasBandwidth,
  presenceAntennaPort1     PresenceAntennaPort1,
  cellReselectionPriority  CellReselectionPriority    OPTIONAL,   -- Need OP
    neighCellConfig        NeighCellConfig,
  q-OffsetFreq         Q-OffsetRange      DEFAULT dB0,
  interFreqNeighCellList      InterFreqNeighCellList    OPTIONAL,   -- Need OR
  interFreqBlackCellList      InterFreqBlackCellList    OPTIONAL,   -- Need OR
  ...,
  [[ q-QualMin-r9      Q-QualMin-r9    OPTIONAL,      -- Need OP
     threshX-Q-r9      SEQUENCE {
       threshX-HighQ-r9        ReselectionThresholdQ-r9,
       threshX-LowQ-r9         ReselectionThresholdQ-r9
     }                 OPTIONAL     -- Cond RSRQ
  ]],
  [[q-QualMinWB-r11    Q-QualMin-r9     OPTIONAL -- Cond WB-RSRQ
  ]]
}
InterFreqCarrierFreqInfo-v8h0 ::= SEQUENCE {
  multiBandInfoList    MultiBandInfoList    OPTIONAL -- Need OR
}
InterFreqCarrierFreqInfo-v9e0 ::= SEQUENCE {
  dl-CarrierFreq-v9e0      ARFCN-ValueEUTRA-v9e0    OPTIONAL,    -- Cond
dl-FreqMax
  multiBandInfoList-v9e0   MultiBandInfoList-v9e0   OPTIONAL -- Need OR
}
InterFreqCarrierFreqInfo-v10j0 ::= SEQUENCE {
  freqBandInfo-r10         NS-PmaxList-r10     OPTIONAL, -- Need OR
  multiBandInfoList-v10j0  MultiBandInfoList-v10j0    OPTIONAL -- Need OR
}
InterFreqCarrierFreqInfo-v1010 ::= SEQUENCE {
  freqBandInfo-v1010       NS-PmaxList-v1010   OPTIONAL, -- Need OR
  multiBandInfoList-v1010  MultiBandInfoList-v1010    OPTIONAL -- Need OR
}
InterFreqCarrierFreqInfo-v1250 ::= SEQUENCE {
  reducedMeasPerformance-r12    ENUMERATED {true}   OPTIONAL,    --Need OP
  q-QualMinRSRQ-OnAllSymbols-r12   Q-QualMin-r9      OPTIONAL -- Cond
RSRQ2
}
InterFreqCarrierFreqInfo-r12 ::=    SEQUENCE {
  dl-CarrierFreq-r12       ARFCN-ValueEUTRA-r9,
  q-RxLevMin-r12           Q-RxLevMin,
  p-Max-r12                P-Max         OPTIONAL,    -- Need OP
  t-ReselectionEUTRA-r12   T-Reselection,
  t-ReselectionEUTRA-SF-r12    SpeedStateScaleFactors    OPTIONAL,  -- Need
OP
  threshX-High-r12         ReselectionThreshold,
  threshX-Low-r12          ReselectionThreshold,
  allowedMeasBandwidth-r12     AllowedMeasBandwidth,
  presenceAntennaPort1-r12     PresenceAntennaPort1,
  cellReselectionPriority-r12  CellReselectionPriority    OPTIONAL,   -- Need OP
  neighCellConfig-r12          NeighCellConfig,
  q-OffsetFreq-r12         Q-OffsetRange      DEFAULT dB0,
  interFreqNeighCellList-r12      InterFreqNeighCellList    OPTIONAL,   -- Need
OR
  interFreqBlackCellList-r12      InterFreqBlackCellList    OPTIONAL,   -- Need
OR
  q-QualMin-r12    Q-QualMin-r9    OPTIONAL,   --Need OP
     threshX-Q-r12     SEQUENCE {
       threshX-HighQ-r12       ReselectionThresholdQ-r9,
       threshX-LowQ-r12        ReselectionThresholdQ-r9
     }        OPTIONAL, -- Cond RSRQ
  q-QualMinWB-r12   Q-QualMin-r9     OPTIONAL,    -- Cond WB-RSRQ
  multiBandInfoList-r12    MultiBandInfoList-r11    OPTIONAL, -- Need OR
```

```
    reducedMeasPerformance-r12    ENUMERATED {true}    OPTIONAL, -- Need OP
    q-QualMinRSRQ-OnAllSymbols-r12    Q-QualMin-r9    OPTIONAL,    -- Cond RSRQ2
    ...
}
InterFreqCarrierFreqInfo-v1310 ::= SEQUENCE {
    cellReselectionSubPriority-r13    CellReselectionSubPriority-r13    OPTIONAL, -- Need OP
    redistributionInterFreqInfo-r13    RedistributionInterFreqInfo-r13    OPTIONAL, --Need OP
    cellSelectionInfoCE-r13    CellSelectionInfoCE-r13    OPTIONAL, -- Need OP
    t-ReselectionEUTRA-CE-r13    T-ReselectionEUTRA-CE-r13    OPTIONAL -- Need OP
}
InterFreqCarrierFreqInfo-v1350 ::= SEQUENCE {
    cellSelectionInfoCE1-r13    CellSelectionInfoCE1-r13    OPTIONAL -- Need OP
}
InterFreqCarrierFreqInfo-v1360 ::= SEQUENCE {
    cellSelectionInfoCE1-v1360    CellSelectionInfoCE1-v1360    OPTIONAL    --    Cond QrxlevminCE1
}
InterFreqCarrierFreqInfo-v15xy ::= SEQUENCE {
    redistributionInterFreqInfoCE-r15    RedistributionInterFreqInfo-r13    OPTIONAL, --Need OP
    redistributionInterFreqInfoCE1-r15    RedistributionInterFreqInfo-r13    OPTIONAL, --Need OP
    q-offsetRedistrCE    ENUMERATED {Infinity}    OPTIONAL, --Need OP
    q-offsetRedistrCE1    ENUMERATED {Infinity}    OPTIONAL, --Need OP
}
InterFreqNeighCellList    ::=    SEQUENCE    (SIZE    (1..maxCellInter))    OF InterFreqNeighCellInfo
InterFreqNeighCellInfo ::=    SEQUENCE {
    physCellId    PhysCellId,
    q-OffsetCell    Q-OffsetRange
}
InterFreqBlackCellList    ::=    SEQUENCE    (SIZE    (1..maxCellBlack))    OF PhysCellIdRange
RedistributionInterFreqInfo-r13 ::=    SEQUENCE {
    redistributionFactorFreq-r13    RedistributionFactor-r13 OPTIONAL,    --Need OP
    redistributionNeighCellList-r13    RedistributionNeighCellList-r13    OPTIONAL --Need OP
}
RedistributionNeighCellList-r13    ::=    SEQUENCE (SIZE    (1..maxCellInter))    OF RedistributionNeighCell-r13
RedistributionNeighCell-r13 ::=    SEQUENCE {
    physCellId-r13    PhysCellId,
    redistributionFactorCell-r13    RedistributionFactor-r13
}
RedistributionFactor-r13 ::= INTEGER(1..10)
-- ASN1STOP
```

The invention claimed is:

1. A cell reselection control method in a mobile communication system, the control method comprising:
    transmitting through broadcast signaling, by a base station, as a redistribution parameter used for a redistribution function, a first redistribution parameter applied to a radio terminal in a first coverage and a second redistribution parameter applied to a radio terminal in a second coverage outside the first coverage, wherein the second coverage is a coverage extended by an enhanced coverage function including repetitive transmissions;
    acquiring, by the radio terminal in an idle mode in the second coverage, the transmitted second redistribution parameter; and
    performing, by the radio terminal in the idle mode in the second coverage, cell reselection using the acquired second redistribution parameter, wherein
    the redistribution function is a function in which a plurality of radio terminals in the idle mode concentrated on a specific cell or a specific frequency are distributed in cells and/or frequencies based on an identifier of each of the plurality of radio terminals,
    the redistribution parameter includes a parameter indicating a probability for each cell or a parameter indicating a probability for each frequency.

2. The cell reselection control method according to claim 1, wherein
    the enhanced coverage function has a plurality of enhanced coverage levels with different degrees of coverage extension,
    in the transmitting, the base station individually transmits the second redistribution parameter for each of the plurality of enhanced coverage levels, and
    in the acquiring, the radio terminal in the idle mode in the second coverage acquires the second redistribution parameter corresponding to an enhanced coverage level applied to the radio terminal.

3. The cell reselection control method according to claim 1, further comprising:
    performing, by the radio terminal, cell reselection by ranking based on reception power when the radio terminal in the idle mode in the second coverage does not acquire the second redistribution parameter, wherein the performing the cell reselection using the acquired second redistribution parameter includes performing, by the radio terminal, the cell reselection based on the second redistribution parameter and the identifier of the radio terminal instead of the ranking when the radio terminal acquires the second redistribution parameter.

4. The cell reselection control method according to claim 3, wherein the second redistribution parameter is applied to cell reselection at least within a same frequency, and the performing the cell reselection using the acquired second redistribution parameter includes performing cell reselection within the same frequency based on the second redistribution parameter and the identifier of the radio terminal.

5. The cell reselection control method according to claim 1, further comprising:

performing, by the radio terminal, cell reselection by ranking based on reception power when the radio terminal in the idle mode in the second coverage does not acquire the second redistribution parameter; and performing, by the radio terminal, the cell reselection by applying a predetermined offset value to the ranking when the radio terminal acquires the second redistribution parameter.

6. The cell reselection control method according to claim 5, wherein the second redistribution parameter includes the offset value.

7. A base station in a mobile communication system, the base station comprising:

a transmitter configured to transmit, through broadcast signaling, a redistribution parameter used for a redistribution function, wherein the redistribution function is a function in which a plurality of radio terminals in an idle mode concentrated on a specific cell or a specific frequency are distributed in cells and/or frequencies based on an identifier of each of the plurality of radio terminals, the transmitter is configured to transmit, as the redistribution parameter, a first redistribution parameter applied to a radio terminal in a first coverage and a second redistribution parameter to be applied to a radio terminal in a second coverage outside the first coverage, and the second coverage is a coverage extended by an enhanced coverage function including repetitive transmissions, wherein the redistribution parameter includes a parameter indicating a probability for each cell or a parameter indicating a probability for each frequency.

8. A radio terminal in a mobile communication system, the radio terminal comprising:

a controller configured to acquire the second redistribution parameter from the base station according to claim 7, and perform cell reselection using the acquired second redistribution parameter.

* * * * *